（12）United States Patent
Fujimoto et al.

(10) Patent No.: US 10,135,048 B2
(45) Date of Patent: Nov. 20, 2018

(54) LEAD-ACID BATTERY

(71) Applicant: GS Yuasa International Ltd., Kyoto-shi, Kyoto (JP)

(72) Inventors: Naoki Fujimoto, Kyoto (JP); Kenji Yamanaka, Kyoto (JP)

(73) Assignee: GS Yuasa Internationl Ltd., Kyoto (JP)

( * ) Notice: Subject to any disclaimer, the term of this patent is extended or adjusted under 35 U.S.C. 154(b) by 281 days.

(21) Appl. No.: 15/052,352

(22) Filed: Feb. 24, 2016

(65) Prior Publication Data

US 2016/0254510 A1  Sep. 1, 2016

(30) Foreign Application Priority Data

Feb. 27, 2015 (JP) ................. 2015-038417

(51) Int. Cl.
*H01M 2/12* (2006.01)
*H01M 2/04* (2006.01)
*H01M 10/12* (2006.01)

(52) U.S. Cl.
CPC ......... *H01M 2/1252* (2013.01); *H01M 2/043* (2013.01); *H01M 10/12* (2013.01); *H01M 2220/20* (2013.01); *Y02E 60/126* (2013.01)

(58) Field of Classification Search
None
See application file for complete search history.

(56) References Cited

U.S. PATENT DOCUMENTS

| 2003/0017381 A1 | 1/2003 | Mazumdar |
| 2008/0032186 A1 | 2/2008 | Muhe |
| 2010/0178552 A1 | 7/2010 | Kim |
| 2012/0052348 A1 | 3/2012 | Andersen |

(Continued)

FOREIGN PATENT DOCUMENTS

| EP | 1156540 | 11/2001 |
| JP | 1126058 | 8/1989 |

(Continued)

OTHER PUBLICATIONS

JP2008117582 Machine translation. Ouchi et al. May 2008. Japan. (Year: 2008).*

(Continued)

*Primary Examiner* — Basia A Ridley
*Assistant Examiner* — Christopher P Domone
(74) *Attorney, Agent, or Firm* — Rankin, Hill & Clark LLP

(57) ABSTRACT

Provided is a lead-acid battery which includes: a power generating element; an electrolyte solution; a container which houses the power generating element and the electrolyte solution; and a lid member which is configured to seal the container and in which an exhaust space and a sleeve member are formed, the exhaust space communicating with an outside, an inside of the container being communicated with the exhaust space through the sleeve member. A bottom surface of the exhaust space is inclined such that a solution in the space returns to the inside of the container. The sleeve member has blocking elements arranged in a spaced-apart manner in an extending direction of the sleeve member. The inside of the container is communicated with the exhaust space through a space formed between the blocking elements.

10 Claims, 19 Drawing Sheets

(56) References Cited

U.S. PATENT DOCUMENTS

| | | |
|---|---|---|
| 2014/0017539 A1 | 1/2014 | Gibellini |
| 2014/0023911 A1 | 1/2014 | Gibellini |
| 2014/0147733 A1 | 5/2014 | Park |

FOREIGN PATENT DOCUMENTS

| | | | |
|---|---|---|---|
| JP | 1132059 | | 9/1989 |
| JP | 2001357830 | | 12/2001 |
| JP | 2002313304 | | 10/2002 |
| JP | 2003178749 | | 6/2003 |
| JP | 2005050699 A2 | | 2/2005 |
| JP | 2008117582 | * | 5/2008 |
| JP | 4138275 | | 8/2008 |
| JP | 4516098 B2 | | 8/2010 |
| JP | 2010272264 | * | 12/2010 |
| JP | 4698153 B2 | | 6/2011 |
| JP | 4715089 | | 7/2011 |
| JP | 4715090 | | 7/2011 |
| JP | 2012515428 | | 7/2012 |
| JP | 5048652 | | 10/2012 |
| JP | 2013004436 A2 | | 1/2013 |
| JP | 5148861 | | 2/2013 |
| JP | 5148862 | | 2/2013 |
| JP | 5183985 | | 4/2013 |
| JP | 5295113 | | 9/2013 |
| JP | 5326196 | | 10/2013 |
| JP | 5326291 | | 10/2013 |
| JP | 5348951 B2 | | 11/2013 |
| JP | 5365046 B2 | | 12/2013 |
| JP | 5365080 B2 | | 12/2013 |
| JP | 5396161 B2 | | 1/2014 |
| JP | 5446326 B2 | | 3/2014 |
| JP | 2014510379 | | 4/2014 |
| JP | 2014513386 | | 5/2014 |
| JP | 5521390 B2 | | 6/2014 |
| JP | 2014107262 A2 | | 6/2014 |
| JP | 5095992 | | 12/2014 |
| WO | 2010140408 | | 12/2010 |

OTHER PUBLICATIONS

JP2010272264 Machine translation. Maeda et al. Dec. 2010. Japan (Year: 2010).*

* cited by examiner

LEAD-ACID BATTERY

CROSS-REFERENCE TO RELATED APPLICATIONS

This application claims the benefit of Japanese patent application No. 2015-038417, filed on Feb. 27, 2015, which is incorporated by reference.

FIELD

The present invention relates to a technique for suppressing a leakage of solution droplets caused by vibrations.

BACKGROUND

A lead-acid battery used in an automobile or the like has, for suppressing rising of an internal pressure of the battery, a structure for discharging a gas generated in a container. For example, Japanese patent No. 5521390 (patent literature 1) discloses a structure where an exhaust sleeve portion and an exhaust chamber are formed between a middle lid and an upper lid which seal the container. A gas generated in the container is discharged to the outside through the exhaust sleeve portion and the exhaust chamber. Further, in patent literature 1, a gradient which is inclined toward a return flow hole is imparted to a bottom surface of the exhaust chamber and solution droplets in the exhaust chamber are made to return to the container through the return flow hole.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

As described above, patent literature 1 discloses the configuration where solution droplets in the exhaust chamber (exhaust space) return to the inside of the container. However, when vibrations are continuously applied to a lead-acid battery, there may be a case where solution droplets leak to the outside from an outlet portion of the exhaust chamber (exhaust space).

The present invention has been made in view of such circumstances, and it is an object of the present invention to provide a lead-acid battery where a leakage of solution droplets caused by vibrations can be suppressed.

A lead-acid battery according to an aspect of the present invention includes: a power generating element; an electrolyte solution; a container which houses the power generating element and the electrolyte solution; and a lid member which is configured to seal the container and in which an exhaust space and a sleeve member are formed, the exhaust space communicating with an outside, an inside of the container being communicated with the exhaust space through the sleeve member, wherein a bottom surface of the exhaust space is inclined such that a solution in the space returns to the inside of the container, the sleeve member has a plurality of blocking elements arranged in a spaced-apart manner in an extending direction of the sleeve member, and the inside of the container is communicated with the exhaust space through a space formed between the plurality of blocking elements. The above-mentioned lead-acid battery is a so-called flooded-type lead-acid battery where the inside of the container communicates with the outside, and differs from a sealed-type lead-acid battery (valve-regulated lead-acid battery).

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
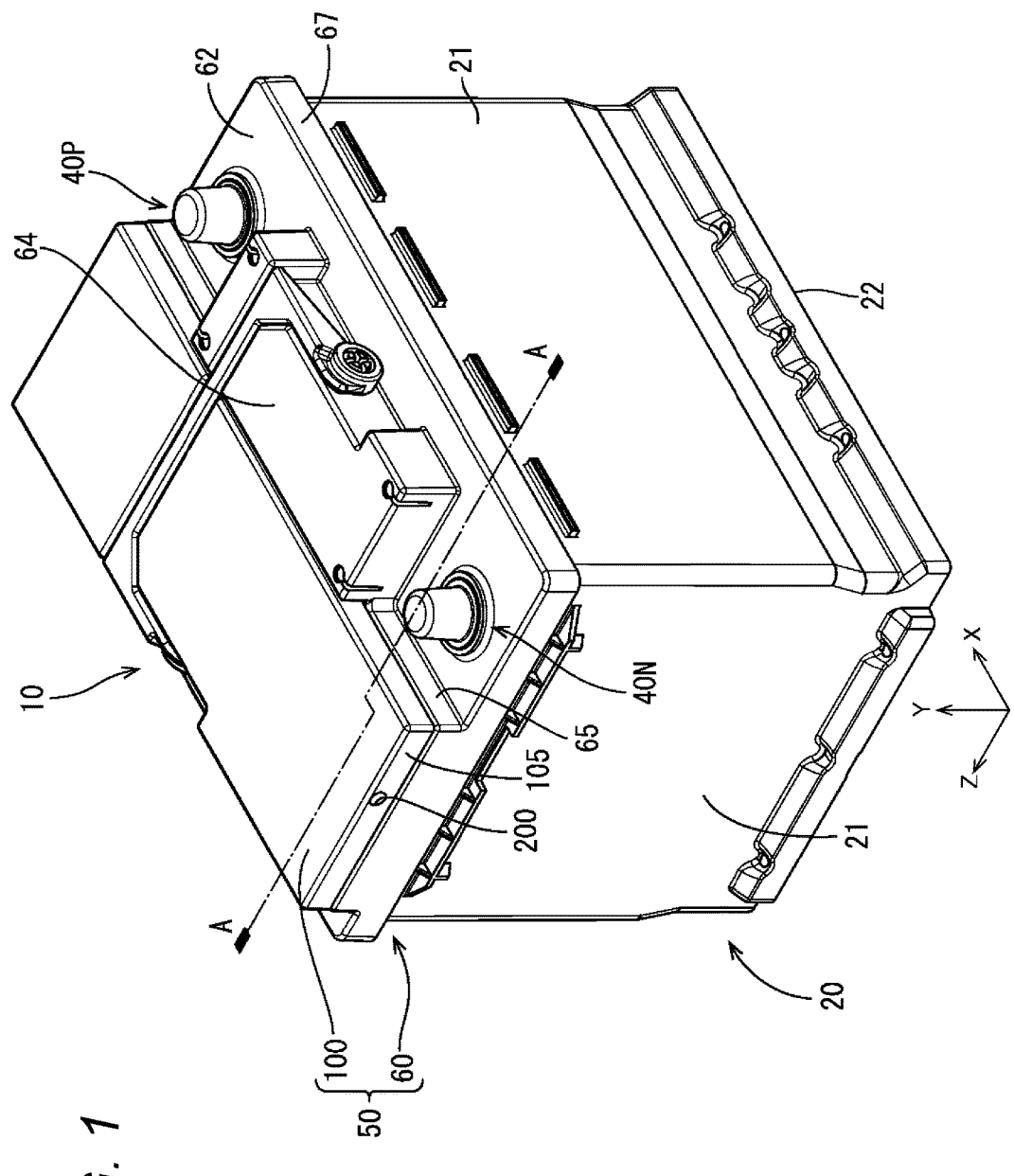
FIG. 1 is a perspective view of a lead-acid battery according to an embodiment 1 of the present invention.

According to an aspect of the present invention, there is provided a lead-acid battery including: a power generating element; an electrolyte solution; a container which houses the power generating element and the electrolyte solution; and a lid member which is configured to seal the container and in which an exhaust space and a sleeve member are formed, the exhaust space communicating with an outside, an inside of the container being communicated with the exhaust space through the sleeve member, wherein a bottom surface of the exhaust space is inclined such that a solution in the space returns to the inside of the container, the sleeve member has a plurality of blocking elements arranged in a spaced-apart manner in an extending direction of the sleeve member, and the inside of the container is communicated with the exhaust space through a space formed between the plurality of blocking elements.

According to the lead-acid battery, it is possible to suppress a leakage of solution droplets caused by vibrations.

In the exhaust space, a solution in the space is made to return to the inside of the container along the inclined bottom surface. Thus, it has conventionally been considered that an electrolyte solution does not stay in the inside of the exhaust space unless the lead-acid battery turns over on its side or turns upside down. It has been considered that even when the electrolyte solution enters the exhaust space from the inside of the container, the entered electrolyte solution returns to the inside of the container. Accordingly, unless the lead-acid battery turns over on its side or turns upside down, the entrance of the electrolyte solution into the exhaust space from the inside of the container has not been considered as a serious problem in general. In the conventional lead-acid battery having a return flow structure, therefore, it is considered unnecessary to provide the above-mentioned plurality of blocking elements on the sleeve member. In actual products, the above-mentioned blocking elements have not been formed on the sleeve member.

Because the entrance of an electrolyte solution into the exhaust space is not generally considered as a serious problem, in the conventional lead-acid battery having a return flow structure, even when a phenomenon occurs where vibrations are continuously applied to the lead-acid battery so that the electrolyte solution leaks from an outlet of the exhaust space, the phenomenon has not attracted attentions in this business field. The inventors of the present invention have made an attempt to find out a cause which brings about the phenomenon that an electrolyte solution leaks from an outlet of an exhaust space when vibrations are continuously applied to a lead-acid battery configured such that the solution droplets in the exhaust space return to the inside of the container. As the cause of a leakage of an electrolytic solution, various causes are considered including, for example, a problem relating to the inclination of a bottom surface of the exhaust space which causes the return of electrolytic solution to the inside of a container and hence, identifying a specific cause was extremely difficult. The inventors of the present invention have extensively observed the movement of an electrolyte solution in the exhaust space, and have found, for the first time in this technical field, that a phenomenon that solution droplets of an electrolyte solution move along a ceiling surface of the exhaust space occurs when vibrations are continuously applied to a lead-acid battery. Based on such finding, the inventors of the present invention have found, for the first time in this technical field, that when vibrations are continuously applied to a lead-acid battery, solution droplets of an electrolyte solution continuously move along a ceiling surface, reaches an outlet of the exhaust space, and leaks to the outside.

In the course of identifying a place where solution droplets which move along a ceiling surface of an exhaust space are generated, the inventors of the present invention also have found that when vibrations are continuously applied to a lead-acid battery, solution droplets of an electrolyte solution splashed from the inside of a container account for most of the solution droplets which move along the ceiling surface of the exhaust space. Compared to solution droplets generated due to condensation of water vapor contained in a gas discharged from the inside of the container, the solution droplets caused by such splash are dominant. Based on such findings, the inventors of the present invention have recognized a phenomenon that solution droplets splashed from the inside of a container enters an exhaust space and moves along a ceiling surface of the exhaust space as a problem to be solved, and have arrived at the present invention.

In the aspect of the present invention, a plurality of blocking elements are formed on a sleeve member communicating with an exhaust space, the plurality of blocking elements are arranged in a spaced-apart manner in the extending direction of the sleeve member, and makes the inside of a container and the exhaust space communicate with each other through a space formed between the plurality of blocking elements. With such a configuration, it is possible to provide a passage through which an electrolyte solution splashed from the inside of a container minimally enters the exhaust space while ensuring a passage through which a gas is discharged from the inside of the container. For the reasons described heretofore, due to the combination of the arrangement of the plurality of blocking elements and the exhaust chamber having a bottom surface with an inclined gradient for returning solution droplets to the container, a problem relating to a leakage of solution at the time of applying vibrations can be remarkably improved thus enabling the manufacture of an improved lead-acid battery which has extremely high reliability in preventing a leakage of solution in a practical use.

Figure 10:
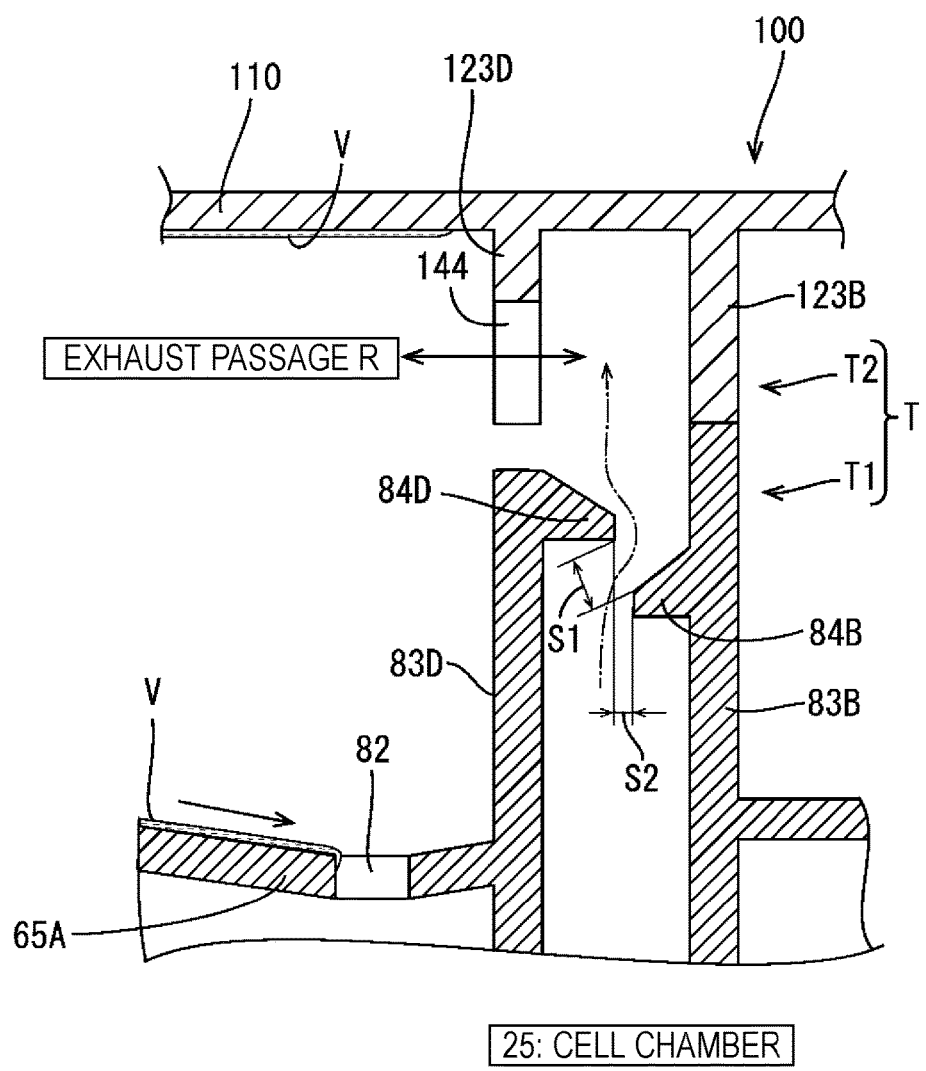
FIG. 10 is a cross-sectional view (cross-sectional view taken along a line B-B in FIG. 8) showing a structure of an exhaust sleeve portion.

To be more specific, assuming that the plurality of blocking elements are arranged at the same height position in the extending direction (height direction) of the sleeve member (see a comparison example shown in FIG. 19), it is necessary to set a space between the plurality of blocking elements to have a fixed width S1 or more which allows discharge of a gas from the inside of the container. On the other hand, as in the case of this embodiment, by arranging the plurality of blocking elements at different height positions at intervals in the extending direction (height direction) of the sleeve member, it is possible to ensure the above-mentioned fixed width S1 using a space between the plurality of blocking elements in the extending direction of the sleeve member thus enabling discharge of a gas. Accordingly, compared to the case where the plurality of blocking elements are arranged at the same height position, a distance S2 between the plurality of blocking elements as viewed in the extending direction is set to be smaller than the above-mentioned fixed width S1 as shown in FIG. 10, or the distance S2 can be eliminated. With such a configuration, it is possible to provide a passage through which an electrolyte solution splashed from the inside of the container minimally enters the exhaust space while ensuring a passage through which a gas is discharged from the inside of the container. Accordingly, an amount of electrolyte solution which moves along a ceiling surface of the exhaust space can be reduced and hence, a leakage of solution droplets caused by vibrations can be suppressed.

The following configurations are preferable as modes for carrying out the lead-acid battery according to the present invention.

The lid member includes: a return flow portion for returning a solution in the exhaust space to the inside of the container; and an exhaust portion provided separately from the return flow portion and making the exhaust space and the inside of the container communicate with each other, and the exhaust portion is formed of the sleeve member having the plurality of blocking elements. In such a configuration, the portion where the inside of the container and the exhaust space communicate with each other are disposed at two places, that is, at the return flow portion and the exhaust portion. The inventors of the present invention have found that, in a case where a plurality of blocking elements arranged as described above are not provided, a following phenomenon occurs when vibrations are continuously applied to a lead-acid battery. When vibrations are continuously applied to the lead-acid battery, at an initial stage, an electrolyte solution enters an exhaust space from both the return flow portion and the exhaust portion. Since the electrolyte solution which enters the exhaust space intends to return to the inside of the container from the return flow portion, the electrolyte solution is gradually stored in the return flow portion. Then, in the course of returning the electrolyte solution to the inside of the container from the return flow portion, the electrolyte solution is subjected to a gas/solution conversion, and air enters the exhaust space from the inside of the container through the exhaust portion. The inventors of the present invention have found that, at this stage of operation, the electrolyte solution enters the exhaust space from the exhaust portion together with air. Accordingly, by providing the plurality of blocking elements arranged as described above in the exhaust portion compared to the return flow portion, it is possible to remarkably prevent the entrance of the electrolyte solution splashed from the inside of the container into the exhaust space and hence, a leakage of solution droplets caused by vibrations can be suppressed further effectively.

The lid member includes: a middle lid which covers the container; and an upper lid joined to an upper portion of the middle lid in an overlapping manner, the sleeve member is formed on the middle lid, and the plurality of blocking elements arranged in the sleeve member are configured not to overlap with each other as viewed in the extending direction of the sleeve member. With such a configuration, by removing a die in the extending direction, simultaneously with molding of the middle lid, the blocking elements can be integrally molded with the sleeve member. Accordingly, it is possible to easily form the blocking elements in the inside of the sleeve member. Further, a cost can be reduced compared to a case where the blocking elements are molded by members separate from the sleeve member.

<Embodiment 1>

An embodiment 1 is described with reference to FIG. 1 to FIG. 15.

1. Structure of Lead-Acid Battery 10

Figure 2:
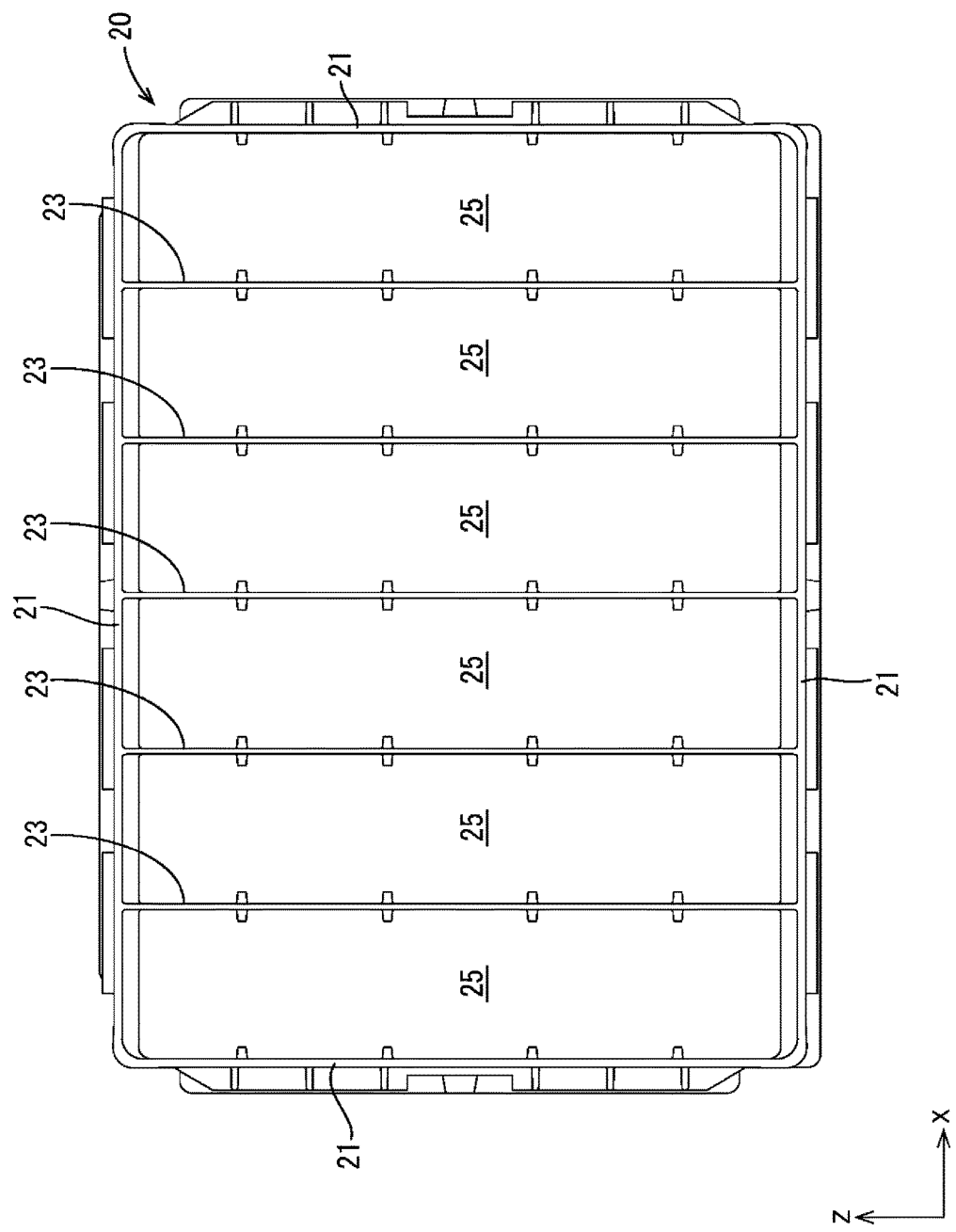
FIG. 2 is a plan view of a container.
Figure 3:
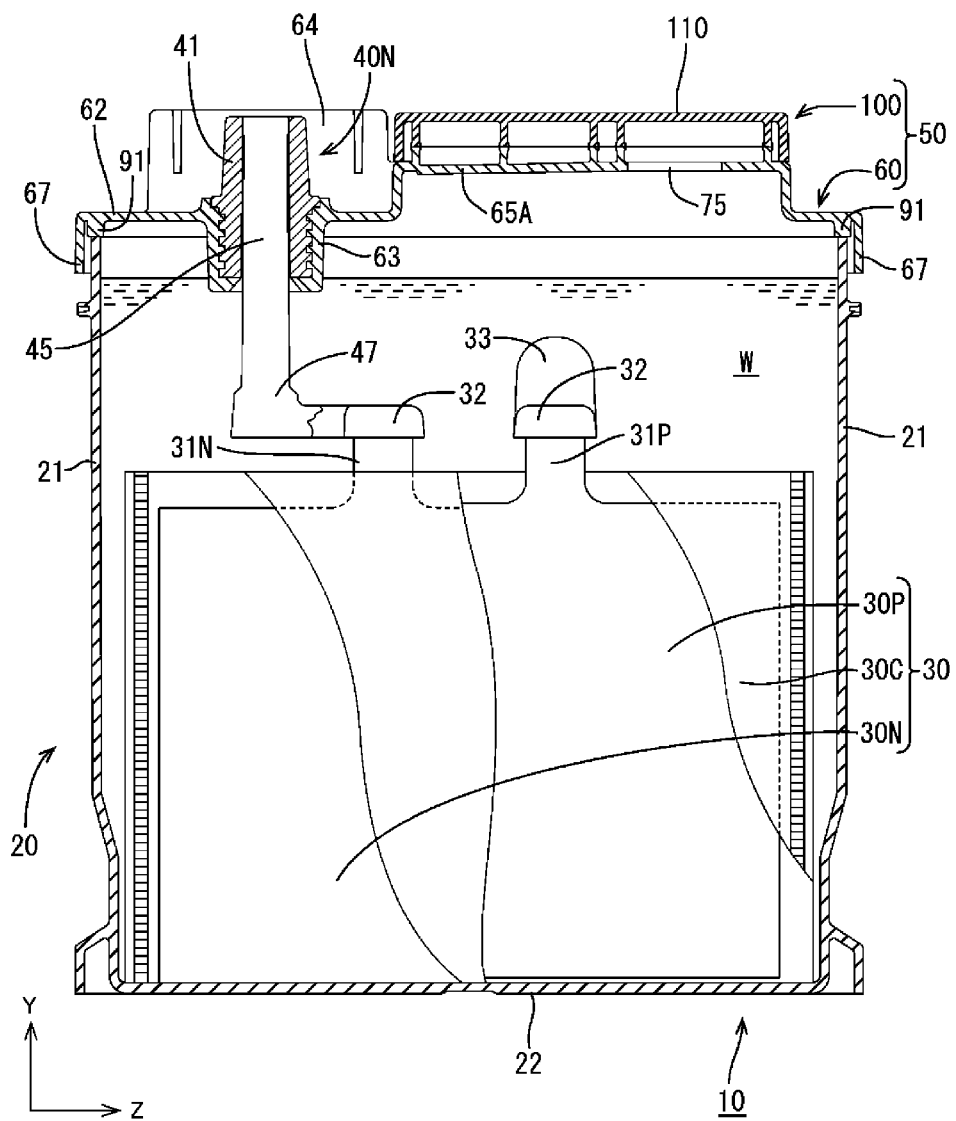
FIG. 3 is a vertical cross-sectional view (a cross-sectional view taken along a line A-A in FIG. 1) of the lead-acid battery.

The lead-acid battery 10 is a flooded-type lead-acid battery. As shown in FIG. 1 to FIG. 3, the lead-acid battery 10 includes a container 20, an element 30 which is a power generating element, an electrolyte solution W, terminal portions 40P, 40N and a lid member 50. In the description made hereinafter, in a state where the container 20 is horizontally placed on an installing surface without inclination with respect to the installing surface, a lateral width direction (a direction along which the terminal portions 40P, 40N are arranged) of the container 20 is assumed as "X direction", a height direction (a vertical direction) of the container 20 is assumed as "Y direction", and a depth direction of the container 20 is assumed as "Z direction".

The container 20 is made of a synthetic resin. The container 20 includes four outer walls 21 and a bottom wall 22, and is formed into a box shape having an open upper surface. As shown in FIG. 2, the container 20 has a plurality of (five in this embodiment) partitions 23. The partitions 23 are formed substantially at equal intervals in the X direction thus partitioning the inside of the container 20 into a plurality of cell chambers 25. Six cell chambers 25 are provided in the lateral width direction (the X direction in FIG. 2) of the container 20. In each cell chambers 25, the element 30 is housed together with an electrolyte solution W made of a dilute sulfuric acid.

As shown in FIG. 3, the element 30 is formed of positive electrode plates 30P, negative electrode plates 30N and separators 30C each of which separates both plates 30P, 30N. The respective plates 30P, 30N are formed by filling a grid with an active material, and lug portions 31P, 31N are formed on upper portions of the respective plates 30P, 30N. The lug portions 31P, 31N are provided for connecting the plates 30P, 30N having the same polarity to each other in the cell chamber 25 by means of a strap 32. A main component of the active material of the positive electrode plate 30P is lead dioxide, and a main component of an active material of the negative electrode plate 30N is lead.

The strap 32 is formed into a plate shape elongated in the X direction, for example, and two sets of straps 32 for a positive electrode and a negative electrode are provided for each cell chamber 25. The structure is adopted where the elements 30 of the respective cell chambers 25 are connected in series by electrically connecting the positive straps 32 in the cell chambers 25 arranged adjacently to each other and also the negative straps 32 in the cell chambers 25 arranged adjacently to each other through connecting portions 33 formed on the straps 32.

Figure 4:
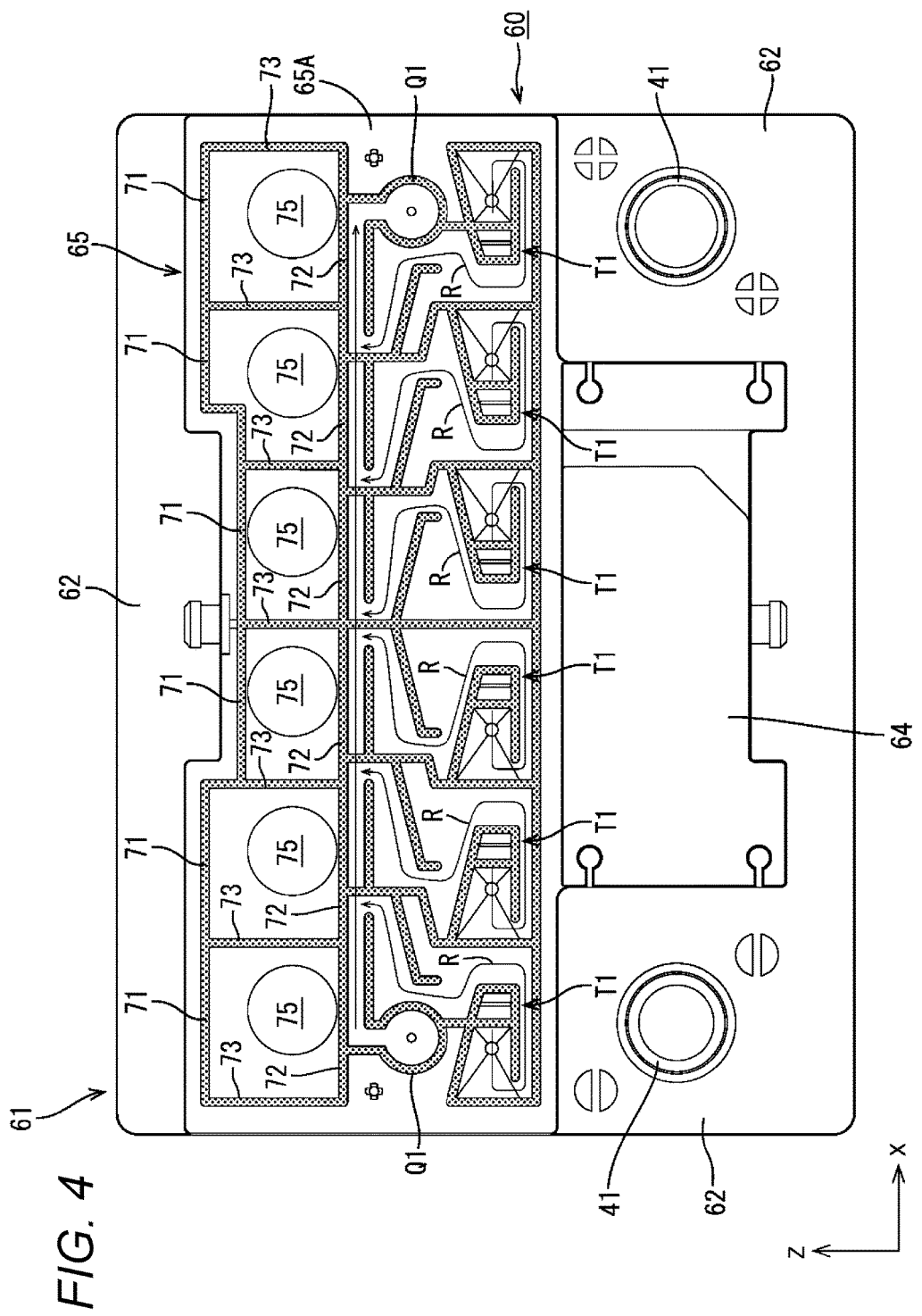
FIG. 4 is a plan view of a middle lid.
Figure 5:
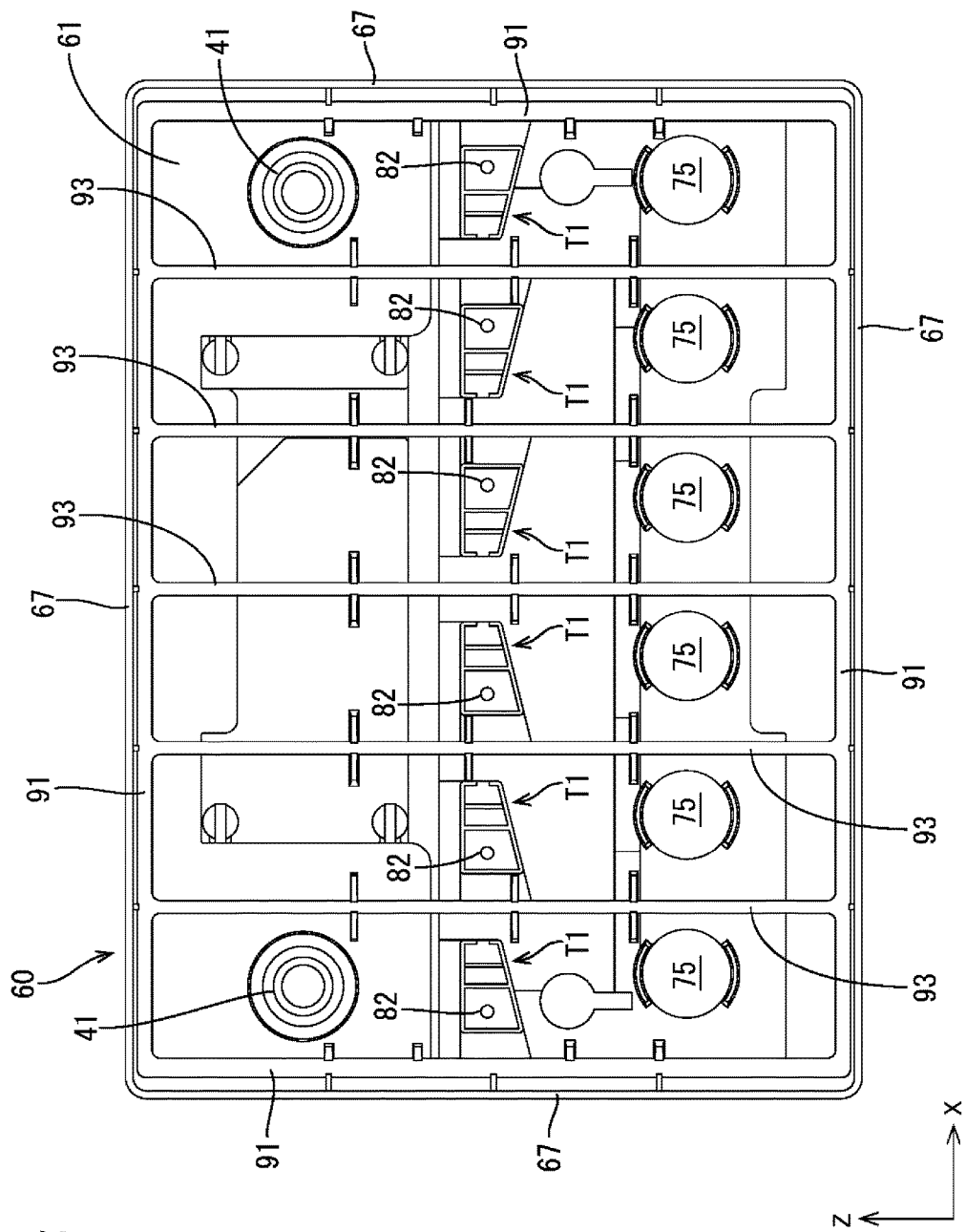
FIG. 5 is a bottom plan view of the middle lid.

The lid member 50 includes a middle lid 60 and an upper lid 100. FIG. 4 is a plan view of the middle lid 60 as viewed from above in a state where the upper lid 100 is removed, and FIG. 5 is a bottom view of the middle lid 60 as viewed from below. The middle lid 60 is made of a synthetic resin, and includes a lid body 61 and a flange portion 67.

The lid body 61 of the middle lid 60 has a size which allows the lid body 61 to seal an upper surface of the container 20. A plurality of ribs 91 and a plurality of lid partitions 93 are formed on a lower surface of the lid body 61. The respective ribs 91 project downward from a lower surface of the lid body 61. The respective ribs 91 are provided corresponding to four outer walls 21 which form the container 20. The respective lid partitions 93, in the same manner as the ribs 91, project downward from a lower surface of the lid body 61. The respective lid partitions 93 are provided corresponding to the respective partitions 23 of the container 20.

The respective ribs 91 of the middle lid 60 are positioned so as to overlap with upper end surfaces of the respective outer walls 21 of the container 20, and the respective lid partitions 93 are positioned so as to overlap with upper end surfaces of the respective partitions 23 of the container 20. By making the ribs 91 and the lid partitions 23 overlap with the respective walls 21, 23 on the container 20, the container 20 and the respective cell chambers 25 have the airtight structure. To maintain airtightness between the respective ribs 91 and the outer wall 21 and between the lid partitions 93 and partitions 23, the respective ribs 91 and the outer wall 21 are bonded to each other by thermal welding, and the lid partitions 93 and the partitions 23 are also bonded to each other by thermal welding. A flange portion 67 is formed on an outer periphery edge of the lid body 61. The flange portion 67 extends downward from a bottom surface of the lid body 61, and surrounds an upper portion of the outer wall 21 of the container 20.

Further, as shown in FIG. 1 and FIG. 4, the lid body 61 of the middle lid 60 has a low surface portion 62, a high surface portion 64 and a plateau portion 65 thus being formed into a shape where the difference in height is made among these portions. The low surface portion 62 is formed on a rear portion side and a front portion side of the lid member 50. A terminal portion 40P on a positive electrode side and a terminal portion 40N on a negative electrode side are arranged on respective low surface portions 62 disposed on both corner portions of the front portion side in the X direction.

The structure of the terminal portion 40P on a positive electrode side and the structure of the terminal portion 40N on a negative electrode side are equal to each other and hence, the structure is described hereinafter by taking the terminal portion 40N on a negative electrode side as an example. As shown in FIG. 3, the terminal portion 40N on a negative electrode side includes a bushing 41 and a pole 45. The bushing 41 is made of metal such as a lead alloy and has a hollow cylindrical shape. As shown in FIG. 3, the bushing 41 penetrates a cylindrical mounting portion 63 integrally formed with the middle lid 60, and an upper half of the bushing 41 projects from an upper surface of the low surface portion 62. The bushing 41 is configured such that the upper half portion of the bushing 41 which is exposed from the upper surface of the low surface portion 62 forms a terminal connecting portion, and a connecting terminal such as a harness terminal (not shown in the drawing) is assembled to the bushing 41.

The middle lid 60 is formed by integral molding by supplying a resin into a die in which the bushing 41 is inserted. Accordingly, the mounting portion 63 is integrally formed with the bushing 41 and covers an outer periphery of a lower portion of the bushing 41 without forming a gap therebetween. That is, the bushing 41 has the structure where portions of the bushing 41 other than the upper half portion which projects from the upper surface of the middle lid 60 are embedded in the mounting portion 63 of the middle lid 60.

The pole 45 is made of metal such as a lead alloy and has a circular columnar shape. The pole 45 is positioned inside the bushing 41. The pole 45 is longer than the bushing 41, an upper portion of the pole 45 is positioned inside the bushing 41, and a lower portion of the pole 45 projects downward from a lower surface of the bushing 41. An upper end portion of the pole 45 is bonded to the bushing 41 by welding, and a proximal end portion 47 of the pole 45 is bonded to the strap 32 of the elements 30.

The high surface portion 64 of the middle lid 60 is formed at the center on a front portion of the lid body 61. The high surface portion 64 is positioned between the low surface portions 62 formed on both corner portions of the lid body 61 in the X direction. An upper surface of the high surface portion 64 is set higher than upper surfaces of the terminal portions 40P, 40N. With such a configuration, even if a metal member or the like is placed on an upper portion of the battery, the metal member is minimally simultaneously brought into contact with the terminal portions 40P, 40N thus preventing the terminal portions 40P, 40N from becoming conductive with each other.

The plateau portion 65 is formed on a rear portion side of the lid body 61. The plateau portion 65 extends in the X direction so as to traverse six cell chambers 25 formed in the container 20. An upper surface of the plateau portion 65 is set higher than the low surface portion 62 and lower than the high surface portion 64.

As shown in FIG. 4, six electrolyte solution filling holes 75 are formed in an upper surface wall 65A of the plateau portion 65 of the middle lid 60 at intervals in the X direction. These six electrolyte solution filling holes 75 vertically penetrate the upper surface wall 65A of the plateau portion 65, and respectively communicate with six cell chambers 25. With such a configuration, it is possible to fill the respective cell chambers 25 of the container 20 with an electrolyte solution W through the respective electrolyte solution filling holes 75.

The plateau portion 65 includes lower-side partitions 71 to 73 which project upward from the upper surface wall 65A. The lower-side partitions 71 to 73 are provided corresponding to the respective electrolyte solution filling holes 75, and form quadrangular frames which surround the respective electrolyte solution filling holes 75. The respective lower-side partitions 72 are arranged on the same straight line extending in the X direction.

Figure 6:
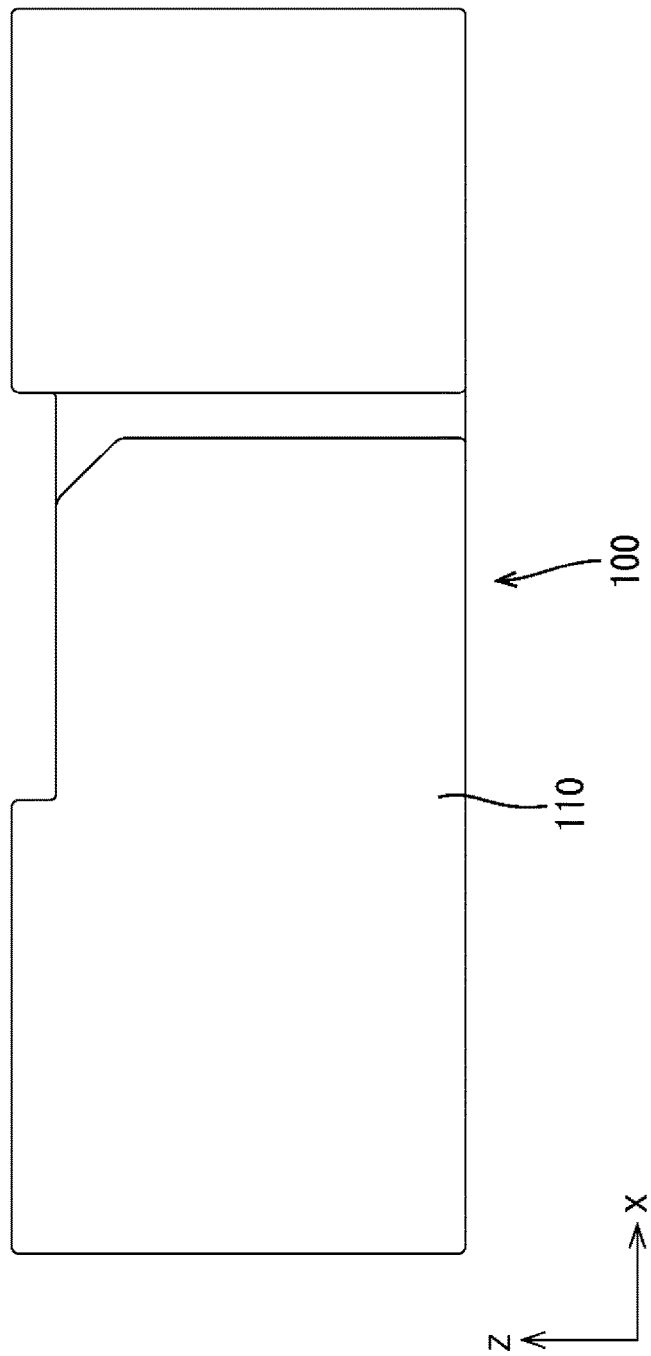
FIG. 6 is a plan view of an upper lid.
Figure 7:
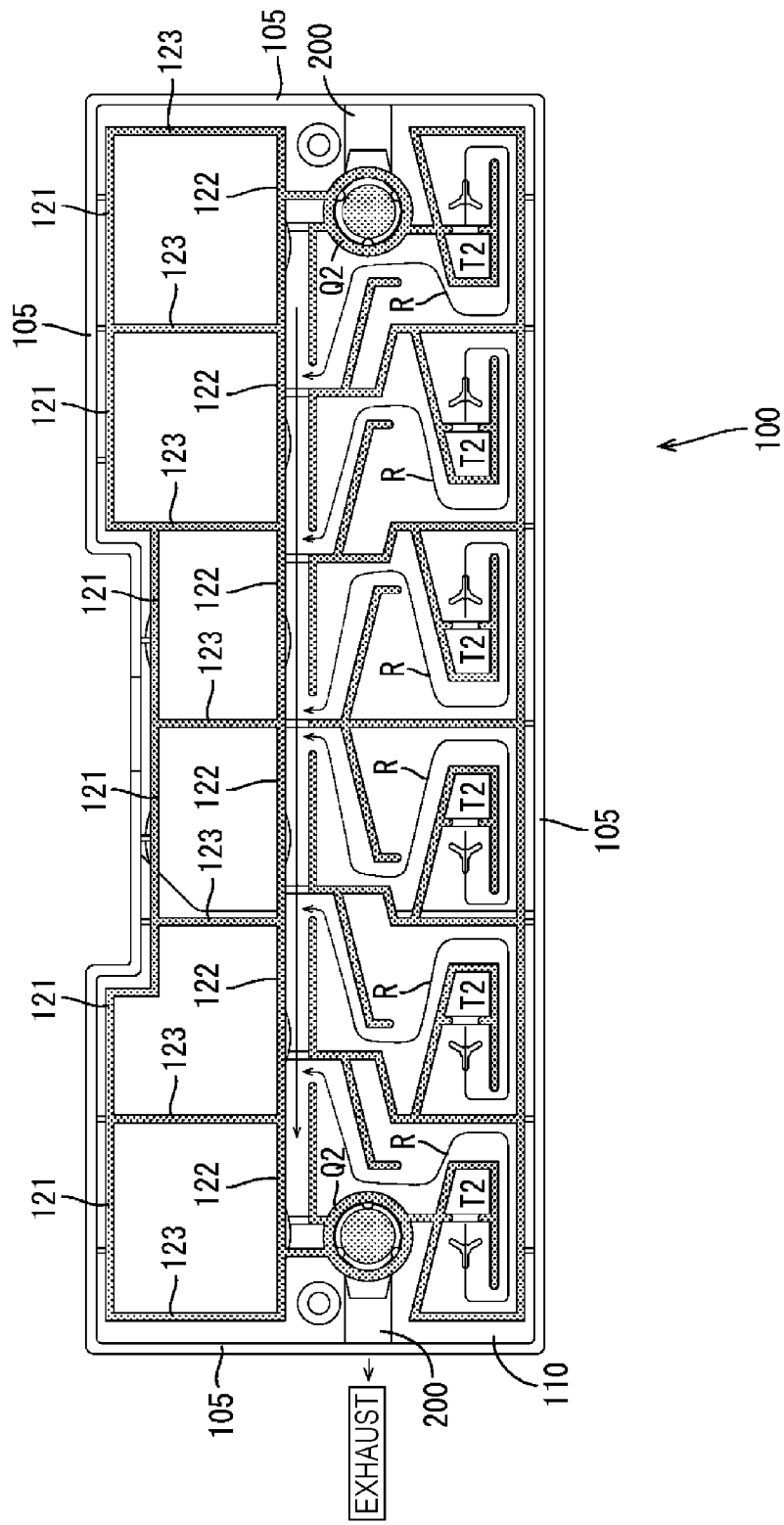
FIG. 7 is a bottom plan view of the upper lid.

The upper lid 100 is made of a synthetic resin in the same manner as the middle lid 60. FIG. 6 is a plan view of the upper lid 100 as viewed from above, and FIG. 7 is a bottom plan view of the upper lid 100 as viewed from below. The upper lid 100 includes a lid body 110 and a flange portion 105. The lid body 110 has a rectangular shape following the shape of the plateau portion 65 of the middle lid 60, and is mounted on the plateau portion 65 of the middle lid 60 in an overlapping manner. The flange portion 105 is formed on an outer periphery edge of the lid body 110. The flange portion 105 extends downward from the outer periphery edge of the lid body 110, and surrounds an outer periphery of the plateau portion 65.

As shown in FIG. 7, the lid body 110 includes upper-side partitions 121 to 123. The upper-side partitions 121 to 123 project downward from a lower surface of the lid body 110, and are provided corresponding to the respective electrolyte solution filling holes 75. The upper-side partitions 121 to 123 form quadrangular frames in the same manner as the lower-side partitions 71 to 73. The respective upper-side partitions 122 are arranged on the same straight line extending in the X direction.

The respective upper-side partitions 121 to 123 correspond to the respective lower-side partitions 71 to 73, and the respective upper-side partitions 121 to 123 are arranged on an upper side of the respective lower-side partitions 71 to 73 in an overlapping manner. These upper-side partitions 121 to 123 and lower-side partitions 71 to 73 form partitions which surround the respective electrolyte solution filling holes 75. The upper-side partitions 121 to 123 and the lower-side partitions 71 to 73 have end surfaces thereof bonded to each other by thermal welding.

Further, the lid member 50 of the lead-acid battery 10 includes, between the middle lid 60 and the upper lid 100, exhaust sleeve portions T, exhaust passages R, a common passage U, and collective exhaust portions Q. Hereinafter, these portions are described in conjunction with the configuration described in the drawings. The exhaust passage R forms one example of "exhaust space" of the present invention. The exhaust sleeve portion T forms one example of "exhaust portion" and "sleeve member" of the present invention. "Vertical direction (the Y direction in FIG. 10)" corresponds to "extending direction" of the present invention.

(Description of Exhaust Sleeve Portion T)

The exhaust sleeve portion T is formed, between the middle lid 60 and the upper lid 100, for each one of the cell chambers 25 of the container 20. The exhaust sleeve portion T is formed into a sleeve shape extending in the vertical direction, and forms a gas flow passage in the inside thereof. The exhaust sleeve portion T communicates with both the cell chamber 25 and the exhaust passage R of the container 20, and performs a function of allowing a gas generated in each cell chamber 25 of the container 20 to pass through each exhaust passage R.

Figure 8:
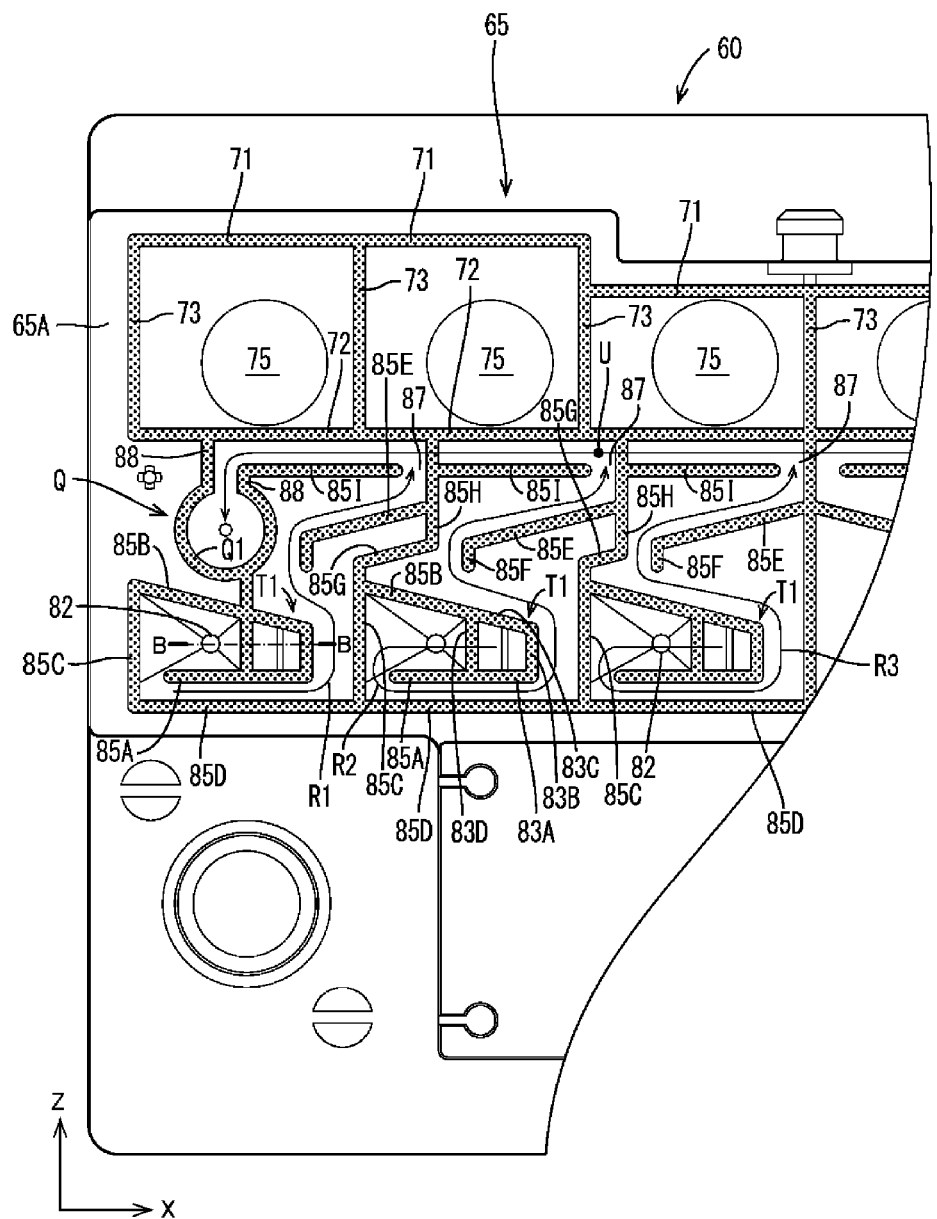
FIG. 8 is a view showing a portion in FIG. 4 in an enlarged manner (showing an exhaust passage of a gas).

To be more specific, as shown in FIG. 4, six sets of lower-side sleeve portions T1 are formed on the plateau portion 65 of the middle lid 60 in a state where the lower-side sleeve portions T1 are arranged in the X direction. Each lower-side sleeve portion T1 extends in the vertical direction, and is formed of an angular sleeve having a hollow inside. As shown in FIG. 8, the each lower-side sleeve portion T1 is formed of four lower-side peripheral walls 83A to 83D. Four lower-side peripheral walls 83A to 83D projects in the vertical direction from the upper surface wall 65A of the plateau portion 65. Four lower-side peripheral walls 83A to 83D vertically penetrate the upper surface wall 65A, and the inside of four lower-side peripheral walls 83A to 83D is hollow. Out of four lower-side peripheral walls 83A to 83D, upper end surfaces of three lower-side peripheral walls 83A to 83C have the same height, and a height of an upper end surface of the lower-side peripheral wall 83D is set lower than the heights of the upper end surfaces of the lower-side peripheral walls 83A to 83C.

Figure 9:
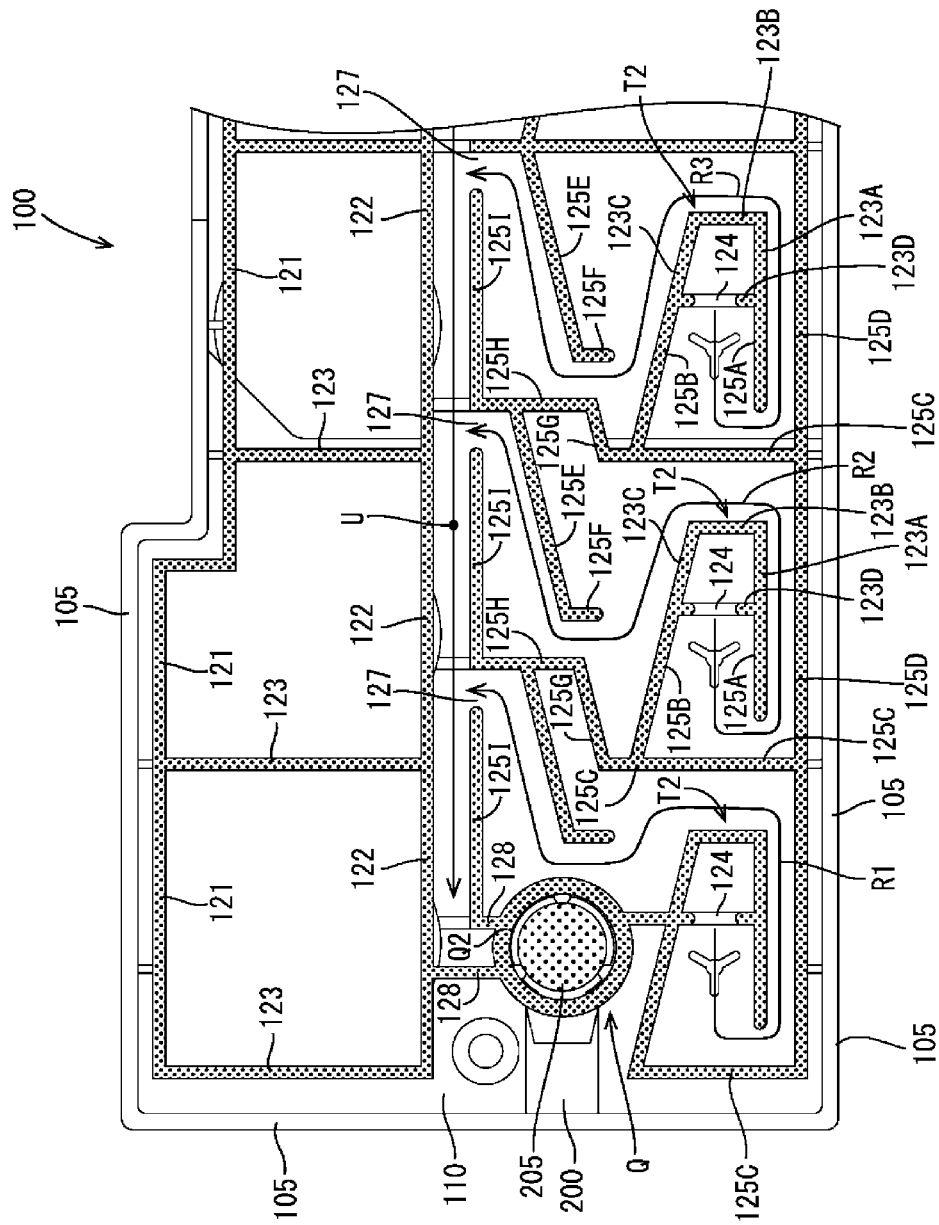
FIG. 9 is a view showing a portion in FIG. 7 in an enlarged manner (showing an exhaust passage of a gas).

On the other hand, as shown in FIG. 7, the lid body 110 of the upper lid 100 includes six sets of upper-side sleeve portions T2 in a state where the upper-side sleeve portions T2 are arranged in the X direction. The upper-side sleeve portion T2 extends in the vertical direction, and is formed of an angular sleeve having a hollow inside. As shown in FIG. 9, the upper-side sleeve portion T2 is formed of four peripheral walls 123A to 123D. Four upper-side peripheral walls 123A to 123D project downward from a lower surface of the lid body 110. Out of the upper-side peripheral walls 123A to 123D, a notched portion 124 is formed on the upper-side peripheral wall 123D which forms a boundary between the exhaust passage R and the upper-side sleeve portion T2. Lower end surfaces of four upper-side peripheral walls 123A to 123D have the same height.

In this embodiment, the exhaust sleeve portion T has the split structure formed of the lower-side sleeve portion T1 and the upper-side sleeve portion T2. Each upper-side sleeve portion T2 and each lower-side sleeve portion T1 vertically overlap with each other thus forming one exhaust sleeve portion T as shown in FIG. 10. Each exhaust sleeve portion T communicates with the cell chamber 25 of the container 20, and communicates with each exhaust passage R through the notched portion 144. With such a configuration, a gas generated in each cell chamber 25 of the container 20 can pass through the inside of the exhaust sleeve portion T and, thereafter, can flow into the exhaust passage R through the notched portion 144. Each lower-side sleeve portion T1 and each upper-side sleeve portion T2 have end surfaces thereof bonded to each other by thermal welding so as to ensure airtightness of the exhaust sleeve portion T.

(Description of Exhaust Passage R)

The exhaust passage R is formed between the middle lid 60 and the upper lid 100 for each one of the cell chambers 25 of the container 20. The respective exhaust passages R communicate with the common passage U and perform a function of making a gas flown out from the exhaust sleeve portions T flow through the common passage U.

Hereinafter, the configuration of the exhaust passages R is specifically described. As shown in FIG. 8, the plateau portion 65 of the middle lid 60 has a plurality of lower-side passage walls 85A to 85I for each one of the cell chambers 25 of the container 20. The plurality of lower-side passage walls 85A to 85I project upward from the upper surface wall 65A of the plateau portion 65. Upper end surfaces of these lower-side passage walls 85A to 85I are set to have the same height.

The lower-side passage wall 85A is a wall formed by extending the lower-side peripheral wall 83A of the lower-side sleeve portion T1 in the leftward direction in the drawing, and is formed continuously with the lower-side peripheral wall 83A. The lower-side passage wall 85B is a wall formed by extending the lower-side peripheral wall 83C of the lower-side sleeve portion T1 in the leftward direction in the drawing, and is formed continuously with the lower-side peripheral wall 83C.

As shown in FIG. 8, the lower-side passage walls 85A to 85I are a mass of walls having different directions. The lower-side passage walls 85A to 85H are connected to other lower-side passage walls 85A to 85H. As viewed from above, the whole wall (the mass of the lower-side passage walls 85A to 85I) is formed into a bent shape. With such a configuration, a path of the exhaust passage R is formed into a non-straight-line labyrinth shape. The lower-side passage wall 85I extends horizontally in the X direction, and has the relationship where the lower-side passage wall 85I faces the lower-side partition 72 in an opposed manner in the Z direction.

On the other hand, as shown in FIG. 9, the lid body 110 of the upper lid 100 has a plurality of upper-side passage walls 125A to 125I for each one of the cell chambers 25 of the container 20. The plurality of upper-side passage walls 125A to 125I project downward from the lower surface of the lid body 110. Lower end surfaces of these upper-side passage walls 125A to 125I are set to have the same height.

The upper-side passage wall 125A is a wall formed by extending the upper-side peripheral wall 123A of the upper-side sleeve portion T2 in the leftward direction in the drawing, and is formed continuously with the upper-side peripheral wall 123A. The upper-side passage wall 125B is a wall formed by extending the upper-side peripheral wall 123C of the upper-side sleeve portion T2 in the leftward direction in the drawing, and is formed continuously with the upper-side peripheral wall 123C.

As shown in FIG. 9, the upper-side passage walls 125A to 125I are also a mass of walls extending in different directions. The upper-side passage walls 125A to 125H are, in the same manner as the lower-side passage walls 85A to 85I, connected to another upper-side passage walls 125A to 125H. As viewed from above, the whole wall (the mass of the upper-side passage walls 125A to 125I) is formed into a bent shape. With such a configuration, a path of the exhaust passage R is formed into a non-straight-line labyrinth shape. The upper-side passage wall 125I extends horizontally in the X direction, and has the relationship where the upper-side passage wall 125I faces the upper-side partition 122 in an opposed manner in the Z direction.

Figure 11:
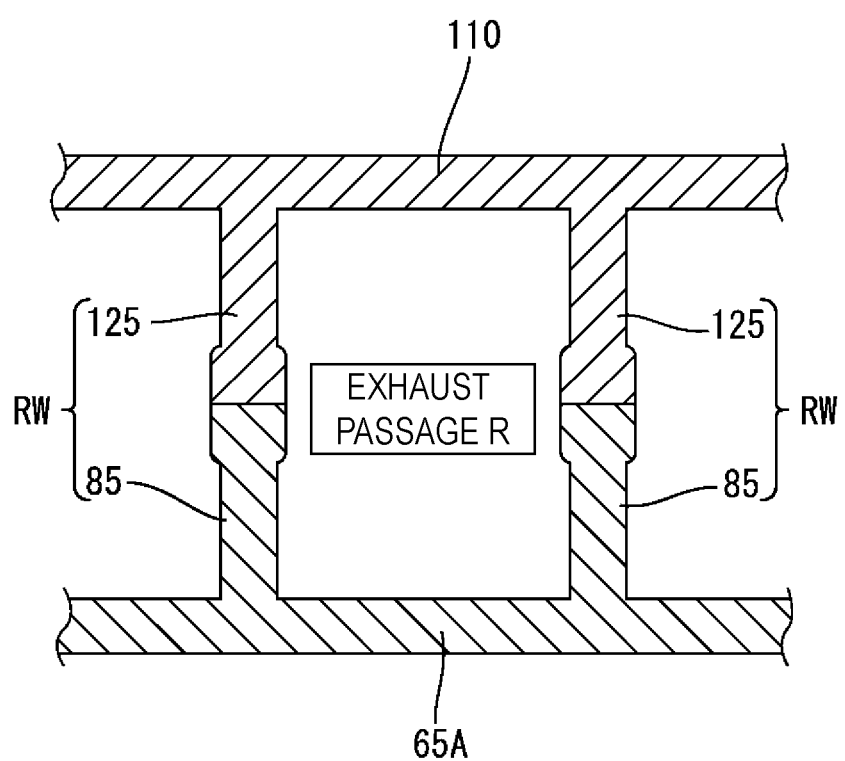
FIG. 11 is a cross-sectional view showing a structure of an exhaust passage.
Figure 12:
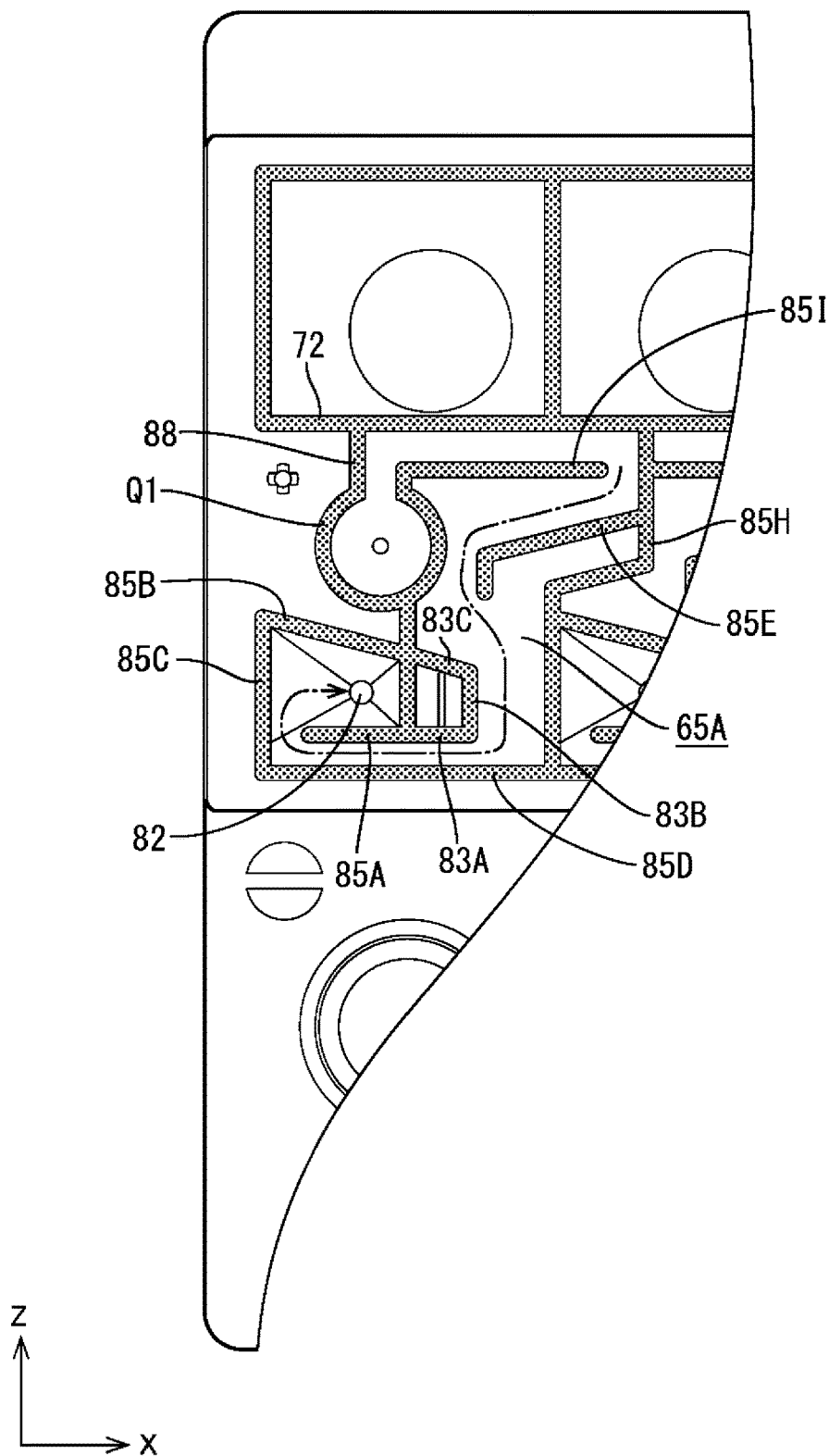
FIG. 12 is a view showing a portion in FIG. 8 in an enlarged manner (showing a return flow passage of an electrolyte solution).

The respective upper-side passage walls 125A to 125I correspond to the respective lower-side passage walls 85A to 85I and overlap with an upper side of the corresponding lower-side passage walls 85A to 85I. As shown in FIG. 11, the lower-side passage wall 85 and the upper-side passage wall 125 form one passage wall RW. The exhaust passage R is formed between a pair of oppositely facing passage walls RW which form side walls. That is, in this embodiment, the passage wall RW which forms the side wall of the exhaust passage R has the split structure which is formed of the upper-side passage wall 125 and the lower-side passage wall 85. The lower-side passage wall 85 and the upper-side passage wall 125 have end surfaces thereof bonded to each other by thermal welding so as to ensure airtightness of the exhaust passage R.

The exhaust passage R takes a path described in FIG. 9. Using the notched portion 124 formed in the upper-side peripheral wall 123D of the exhaust sleeve portion T as an inlet, a gas advances between the upper-side passage wall 125A and the upper-side passage wall 125B in the leftward direction and, thereafter, the gas changes the direction thereof by 90° toward a lower side in FIG. 9 at a position in front of the upper-side passage wall 125C on a left side. Then, the gas passes through a gap formed between the upper-side passage wall 125A and the upper-side passage wall 125C and, thereafter, the gas further changes the direction thereof by 90°, and advances through a gap formed between the upper-side passage wall 125A and the upper-side passage wall 125D and between the upper-side peripheral wall 123A and the upper-side passage wall 125D in the rightward direction. Thereafter, the gas changes the direction thereof toward a rear side in FIG. 9 at a position in front of the upper-side passage wall 125C on a right side.

Then, the gas advances along the upper-side peripheral wall 123C and the upper-side passage wall 125B and, thereafter, passes through a gap formed between the upper-side passage wall 125G and the upper-side passage wall 125E and a gap formed between the upper-side passage wall 125E and the upper-side passage wall 125I sequentially in this order. Eventually, the gas passes through a gap 127 formed between the upper-side passage wall 125I and the upper-side passage wall 125H and reaches the common passage U. Although the exhaust passage R on the upper lid 100 has been described heretofore, the exhaust passage R on the lower lid 60 also takes the same path. Further, the paths of the left and right exhaust passages R with respect to the center in the X direction are arranged in line symmetry (left-and-right symmetry) using the Z direction as an axis of symmetry.

In this embodiment, as shown in FIG. 8 and FIG. 9, the exhaust passage R is formed between the lower-side peripheral wall 83A and the lower-side passage wall 85D and between the upper-side peripheral wall 123A and the upper-side passage wall 125D, while the lower-side peripheral walls 83A to 83C which form the lower-side sleeve portion T1 function as a part of the lower-side passage wall, and the upper-side peripheral walls 123A to 123C which form the upper-side sleeve portion T2 function as a part of the upper-side passage wall.

(Description of Common Passage U and Collective Exhaust Portions Q)

As shown in FIG. 8 and FIG. 9, the common passage U is formed between the lower-side partition 72 and the lower-side passage wall 85I and between the upper-side partition 122 and the upper-side passage wall 125I. That is, the common passage U is a passage formed between two side walls, wherein one side wall is formed of the upper-side partition 122 and the lower-side partition 72 and the other side wall is formed of the upper-side passage wall 125I and the lower-side passage wall 85I. The common passage U extends in the X direction so as to traverse the respective exhaust passages R. A passage width of the common passage U is fixed over the entire length of the common passage U. The collective exhaust portion Q is formed on both end portions in the X direction which form terminals of the common passage U respectively.

The collective exhaust portions Q are formed between the middle lid 60 and the upper lid 100, and perform a function of collectively discharging a gas which flows into the collective exhaust portions Q from the common passage U to the outside. The collective exhaust portions Q are provided in left-and-right pair. Depending on an environment where the lead-acid battery is used, only one of two collective exhaust portions Q is opened and the other of two collective exhaust portions Q is sealed by a plug not shown in the drawing. In this embodiment, a gas which passes through the exhaust passages R1 to R3 passes through the common passage U and, thereafter, is discharged to the outside through the collective exhaust portion Q on a right side as viewed from a front side in the Z direction (a right side in FIG. 4 and a left side in FIG. 7). In FIG. 8, a gas discharging direction is indicated by an arrow assuming that the collective exhaust portion Q on a left side as viewed from a front side in the Z direction is not sealed and is opened without being sealed.

To be more specific, the lower-side sleeve portion Q1 is formed on an upper surface of the plateau portion 65 of the middle lid 60. The lower-side sleeve portion Q1 projects upward from an upper surface wall 65A of the plateau portion 65. On the other hand, the upper-side sleeve portion Q2 is formed on the lid body 110 of the upper lid 100. The upper-side sleeve portion Q2 projects downward from a lower surface of the lid body 110. As shown in FIG. 9, a porous filter 205 is stored in the upper-side sleeve portion Q2. A lower surface of the porous filter 205 is positioned above a distal end surface of the upper-side sleeve portion Q2. The porous filter 205 suppresses the emission of water vapor and suppresses the intrusion of an external spark. The collective exhaust portion Q has the two-split structure formed of the lower-side sleeve portion Q1 on the middle-lid-60 and the upper-side sleeve portion Q2 on the upper-lid-100. The collective exhaust portion Q is configured such that the upper-side sleeve portion Q2 is mounted on an upper side of the lower-side sleeve portion Q1 in an overlapping manner. The lower-side sleeve portion Q1 and the upper-side sleeve portion Q2 have both end portions thereof bonded to each other by thermal welding so as to ensure air-tightness.

The lower-side partition 72 and the lower-side passage wall 85I which form the common passage U are connected to the lower-side sleeve portion Q1 of the middle lid 60 by means of the connecting wall 88, and the upper-side partition 122 and the upper-side passage wall 125I which form the common passage U are connected to the upper-side sleeve portion Q2 of the upper lid 100 by means of the connecting wall 128. The lower-side sleeve portion Q1 has an opening in a connecting portion where the lower-side partition 72 and the lower-side passage wall 85I are connected to the lower-side sleeve portion Q1. Accordingly, the common passage U communicates with the collective exhaust portion Q so that a gas which flows through the respective exhaust passages R1 to R3 flows into the collective exhaust portion Q through the common passage U.

A circular cylindrical exhaust duct 200 is provided to the upper lid 100. One end of the exhaust duct 200 is connected to (communicates with) the upper-side sleeve portion Q2 of the collective exhaust portion Q, and the other end of the exhaust duct 200 penetrates the flange portion 105 of the upper lid 100 and opens to the outside. Accordingly, a gas supplied to the collective exhaust portion Q from the common passage U can be discharged to the outside through the exhaust duct 200.

That is, in the lead-acid battery 10 of this embodiment, a gas generated in the respective cell chambers 25 of the container 20 firstly flows into the respective exhaust passages R from the respective exhaust sleeve portions T. Thereafter, the gas passes through the common passage U and flows into the collective exhaust portion Q and, eventually, the gas is discharged to the outside from the exhaust duct 200.

As shown in FIG. 8, a return flow hole 82 (corresponding to "return flow portion" of the present invention) is formed on the upper surface wall 65A of the plateau portion 65 of the middle lid 60 corresponding to each one of the respective cell chambers 25 of the container 20. Each return flow hole 82 is positioned in a region surrounded by the lower side passage wall 85A, the lower-side peripheral wall 83D, the lower-side passage wall 85B and the lower-side passage wall 85C. That is, each return flow hole 82 is positioned in the exhaust passage R. In the same manner as the exhaust sleeve portion T, the return flow hole 82 vertically penetrates the upper surface wall 65A of the plateau portion 65, and communicates with the cell chamber 25 of the container 20. As shown in FIG. 8, the return flow hole 82 is arranged at an inlet portion of the exhaust passage R and is disposed at a remotest position in the exhaust passage R as viewed from the common passage U.

An inclination (gradient) is imparted to the upper surface wall 65A of the plateau portion 65 which is the bottom surface of the exhaust passage R such that the closer a position on the upper surface wall 65A to the return flow hole 82, the lower the position of the bottom surface becomes (see FIG. 3 and FIG. 10). With such a configuration, as shown in FIG. 10, it is possible to return solution droplets V such as water droplets formed by water vapor contained in a gas to the respective cell chambers 25 through the return flow holes 82. That is, water vapor contained in a gas generated in the cell chamber 25 condenses in the exhaust passage R when the gas passes through the exhaust passage R. The condensed solution droplets V flow toward the return flow hole 82 as indicated by an arrowed broken line in FIG. 12. Accordingly, it is possible to return solution droplets V such as water vapor contained in the gas to the respective cell chambers 25.

2. Suppression of Leakage of Solution Droplets V

The exhaust passage R can return solution droplets V in the passage to the cell chamber 25 of the container 20 along the inclined bottom surface (the upper surface of the upper surface wall 65A of the middle lid 60 in this embodiment). Accordingly, there is no possibility that the solution droplets V stay in the inside of the exhaust passage R unless the lead-acid battery 10 turns over on its side or turns upside down. However, there is a possibility that solution droplets V leak from an outlet of the exhaust duct 200 when vibrations are continuously applied to the lead-acid battery 10 although the lead-acid battery 10 is configured such that the solution droplets V in the exhaust passage R return to the cell chamber 25.

In the course of performing an operation of finding a reason of a leakage of solution droplets V, the inventors of the present invention have extensively observed the movement of the solution droplets V in the exhaust passage R, and have found, for the first time in this technical field, that solution droplets V move along a ceiling surface of the exhaust passage R (the lower surface of the lid body 110 of the upper lid 100 in this embodiment) as shown in FIG. 10 when vibrations are continuously applied to the lead-acid battery 10. Based on such finding, the inventors of the present invention have found, for the first time in this technical field, that when vibrations are continuously applied to the lead-acid battery 10, solution droplets V continuously move along a ceiling surface, reach an outlet of the exhaust duct 200, and leak to the outside.

Further, in the course of identifying a place where solution droplets V which move along the ceiling surface are generated, the inventors of the present invention also have found that when vibrations are continuously applied to the lead-acid battery 10, solution droplets V of an electrolyte solution W splashed from the inside of the container 20 account for most of solution droplets V which move along the ceiling surface of the exhaust passage R compared to solution droplets V generated due to water vapor contained in a gas discharged from the inside of the container 20. Based on such finding, the inventors of the present invention have come up with an idea of suppressing a leakage of solution droplets V by providing a passage through which an electrolyte solution W splashed from the cell chamber 25 of the container 20 minimally enters the exhaust passage R while ensuring a path through which a gas is discharged from the inside of the container 20.

To be more specific, each lower-side sleeve portion T1 of the middle lid 60 includes a plurality of blocking elements 84B, 84D on an inner portion of the sleeve portion T1. As shown in FIG. 10, two blocking elements 84B, 84D in total are formed on inner surfaces of the pair of lower-side peripheral walls 83B, 83D which face each other in an opposed manner such that one blocking element 84B is formed on the inner surface of the lower-side peripheral wall 83B and the other blocking element 84D is formed on the inner surface of the lower-side peripheral wall 83D. The blocking elements 84B, 84D are fixed to the inner surfaces of the lower-side peripheral walls 83B, 83D and hence, the blocking elements 84B, 84D are integrally formed with the lower-side peripheral walls 83B, 83D.

The blocking element 84B projects inward (in the leftward direction in FIG. 10) toward the center of the sleeve from the inner surface of the lower-side peripheral wall 83B, and blocks a portion of an inner space of the lower-side sleeve portion T1. Further, the blocking element 84D projects inward (in the rightward direction in FIG. 10) toward the center of the sleeve from the inner surface of the lower-side peripheral wall 83D, and blocks a portion of the inner space of the lower-side sleeve portion T1. Cross-sectional shapes of the blocking elements 84B, 84D are formed into a substantially trapezoidal shape where an upper surface side is formed of a tapered surface, a lower surface side is formed of a horizontal surface, and an end surface side is formed of a vertical surface.

As shown in FIG. 10, two blocking elements 84B, 84D are arranged in a spaced apart manner in the vertical direction. In this embodiment, the blocking element 84D is positioned on an upper side and the blocking element 84B is positioned on a lower side.

Figure 13:
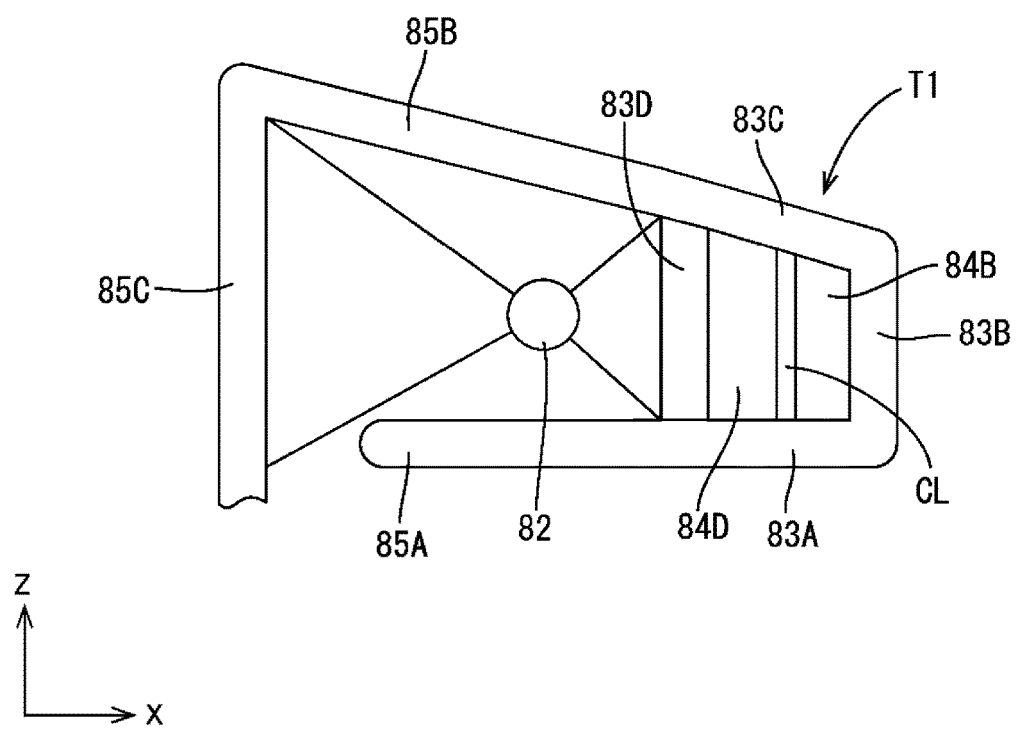
FIG. 13 is a plan view showing the exhaust sleeve portion in an enlarged manner.

As shown in FIG. 13, two blocking elements 84B, 84D are formed over the entire width of the respective lower-side peripheral walls 83B, 83D, and both end portions of the blocking elements 84B, 84D are respectively connected to wall surfaces of the lower-side peripheral walls 83A, 83C. Further, two blocking elements 84B, 84D are formed at positions different from each other in the direction orthogonal to the exhaust sleeve portion T, to be more specific, in the X direction (in the left-and-rightward direction in FIG. 13). As viewed in the vertical direction (Y direction), there is no range where two blocking elements 84B, 84D overlap with each other, and a minute gap CL (having a width S2 in FIG. 10) as viewed in the vertical direction is formed between two blocking elements 84B, 84D as shown in FIG. 13. Further, in the inside of the exhaust sleeve portion T, the inside of the container 20 and the exhaust space R are made to communicate with each other by a passage which is bent so as to be routed around through between these two blocking elements 84B, 84D.

Figure 19:
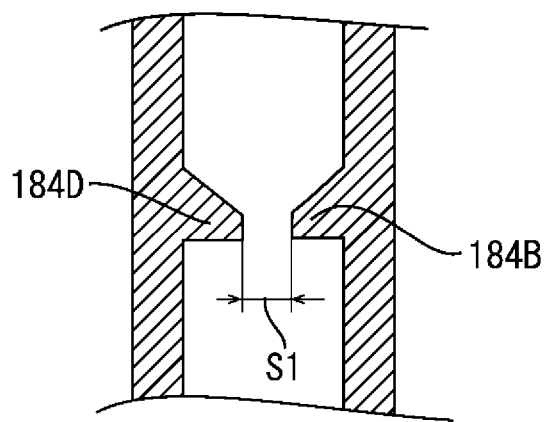
FIG. 19 is a cross-sectional view showing a structure of an exhaust sleeve portion in a comparison example.

Assuming that two blocking elements 184B, 184D are arranged at the same height position in the vertical direction (Y direction) of the exhaust sleeve portion as in the case of a comparison example shown in FIG. 19, it is necessary to set a space between two blocking elements 184B, 184D to have a fixed width S1 or more which allows discharge of a gas from the inside of the container. On the other hand, as in the case of this embodiment shown in FIG. 10 where two blocking elements 84B, 84D are arranged at different height positions in a spaced-apart manner in the vertical direction of the exhaust sleeve portion T, a gas can be discharged while ensuring the above-mentioned fixed width S1 using a space between two blocking elements 84B, 84D in the vertical direction of the exhaust sleeve portion T. Accordingly, compared to the above-mentioned structure (the comparison example shown in FIG. 19), as shown in FIG. 10, a distance between two blocking elements 84B, 84D as viewed in the vertical direction (distance in the X direction) S2 is set to be smaller than the fixed width S1 or the distance S2 can be eliminated.

With such a configuration, it is possible to provide a path through which solution droplets V of an electrolyte solution W splashed from the cell chamber 25 minimally enter the exhaust passage R while ensuring a path through which a gas is discharged from the inside of the container 20 whereby the solution droplets V minimally arrive at the outlet of the exhaust sleeve portion T. Therefore, it is possible to suppress the entrance of solution droplets V of an electrolyte solution W splashed from the cell chamber 25 into the exhaust passage R through the inside of the exhaust sleeve portion T. Accordingly, an amount of solution droplets V which moves along a ceiling surface of the exhaust passage R can be reduced and hence, a leakage of solution droplets V caused by vibrations can be suppressed. Actually, a lead-acid battery was manufactured where the blocking elements 184B, 184D having the structure shown in FIG. 19 are provided while ensuring a width S1 necessary for discharge of a gas, and a discharge chamber is provided where a bottom surface has a gradient which is inclined toward a return flow hole. Such a lead-acid battery, however, cannot acquire a sufficient solution leakage resistance performance against vibrations.

Further, in this embodiment, the portion where the inside of the container 20 and the exhaust passage R are made to communicate with each other is provided at two positions, that is, the return flow hole 82 and the exhaust sleeve portion T. The inventors of the present invention have found that, in a case where the blocking elements 84B, 84D are not formed, when vibrations are continuously applied to the lead-acid battery 10, a following phenomenon occurs. When vibrations are continuously applied to the lead-acid battery 10, at an initial stage, an electrolyte solution W enters the exhaust passage R from both the return flow hole 82 and the exhaust sleeve portion T. Since the electrolyte solution W which enters the exhaust passage R intends to return to the inside of the container 20 from the return flow hole 82, the electrolyte solution W is gradually stored in the return flow hole 82. Then, in the course of returning the electrolyte solution W to the inside of the container 20 from the return flow hole 82, the electrolyte solution W is subjected to a gas-liquid conversion, and air enters the exhaust passage R from the inside of the container 20 through the exhaust sleeve portion T. The inventors of the present invention have found that, at this stage of operation, the electrolyte solution W enters the exhaust passage R from the exhaust sleeve portion T together with air. Accordingly, by providing the blocking elements 84B, 84D to the exhaust sleeve portion T rather than in the return flow hole 82, it is possible to remarkably prevent the entrance of the electrolyte solution W splashed from the inside of the container 20 into the exhaust passage R and hence, a leakage of solution droplets V caused by vibrations can be suppressed further effectively.

3. Structure of Injection Molding Die

Figure 14:
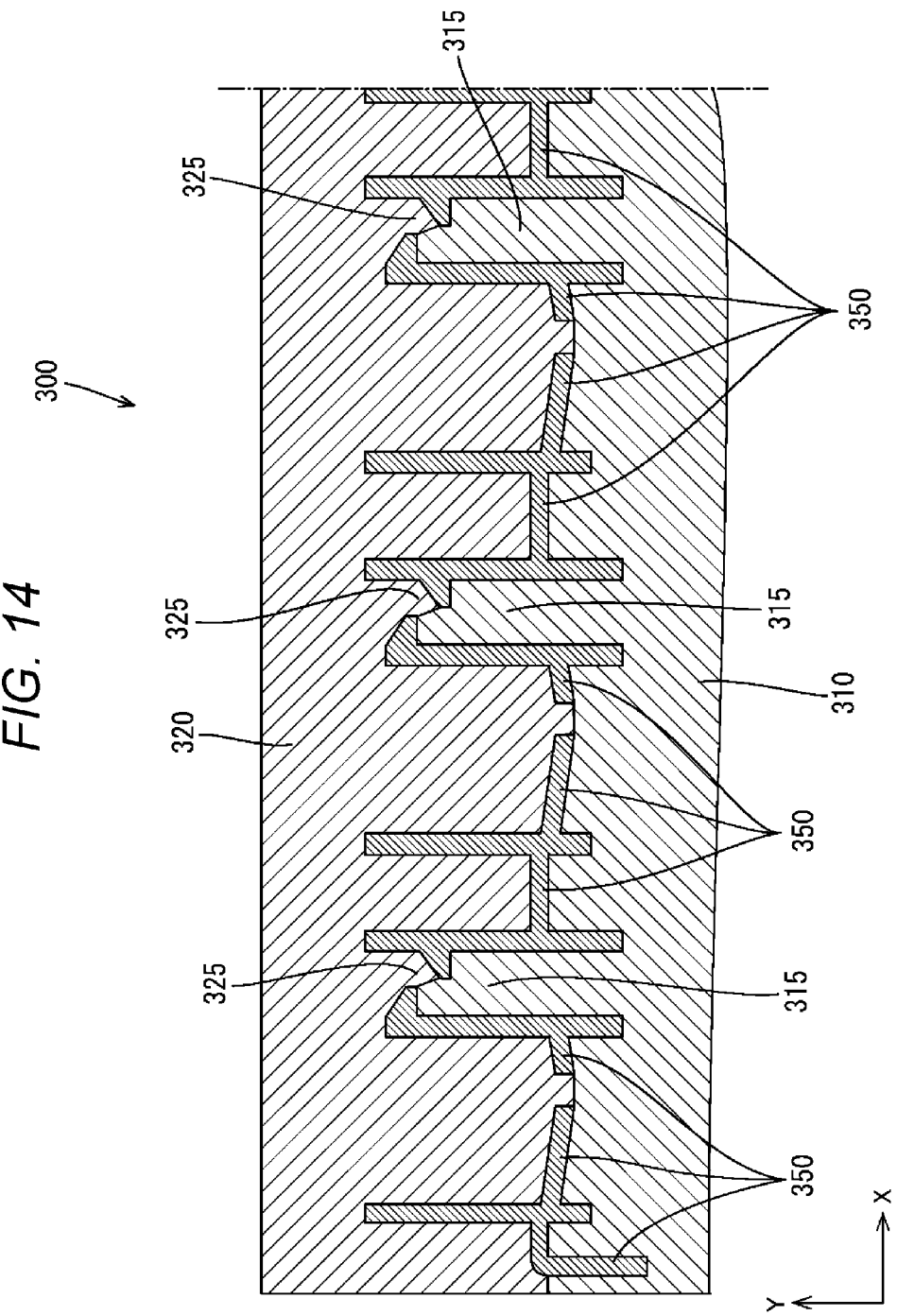
FIG. 14 is a cross-sectional view of an injection molding die for molding the middle lid.
Figure 15:
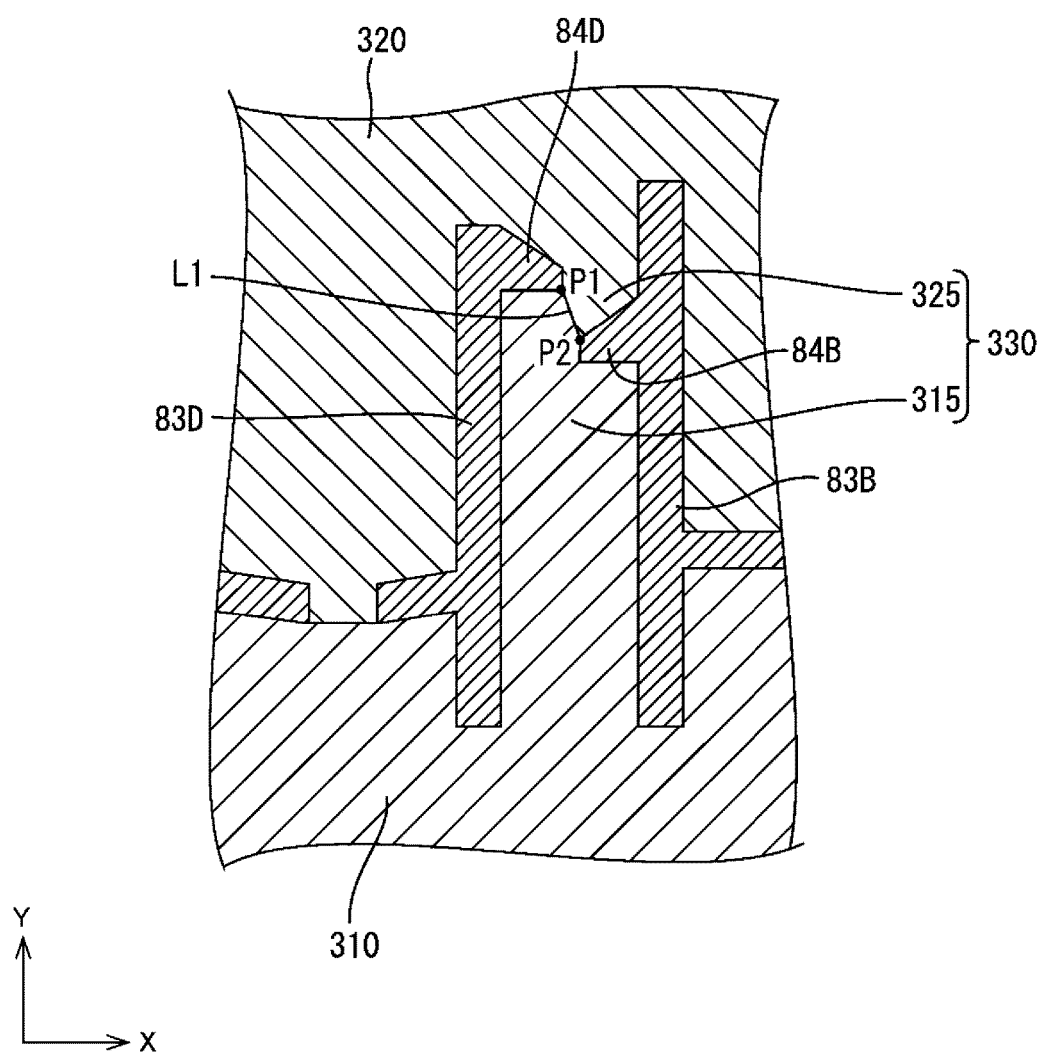
FIG. 15 is a view showing a portion in FIG. 14 in an enlarged manner.

FIG. 14 is a cross-sectional view of an injection molding die for molding the middle lid by injection molding, and FIG. 15 is a view showing a portion of the injection molding die in an enlarged manner. As shown in FIG. 14, the injection molding die 300 is formed of a lower die 310 and an upper die 320. In this embodiment, the lower die 310 is used as a fixed die and the upper die 320 is used as a movable die. Both dies 310, 320 can be fastened together and closed together by operating a die fastening device not shown in the drawing. A cavity (hollow portion) 350 having the same shape as the shape of the middle lid 60 is formed between an upper surface of the lower die 310 and a lower surface of the upper die 320. By filling the inside of the cavity 350 with a molten resin from an injector not showing in the drawing and by cooling and solidifying the molten resin, the middle lid 60 can be molded.

As shown in FIG. 15, the die 300 has a core 330 (a projecting portion for molding). The core 330 is provided for molding an inner surface of the lower-side sleeve portion T1, that is, inner peripheral walls of the lower-side peripheral walls 83A to 83D and the blocking elements 84B, 84D. The core 330 is divided into a lower core 315 formed on the lower die 310, and an upper core 325 formed on the upper die 320. Both cores 315 and 325 are positioned so as to face each other in an opposed manner in the vertical direction.

As shown in FIG. 15, the lower core 315 and the upper core 325 are vertically separated from each other by a straight line L1 which connects distal ends of two blocking elements 84B, 84D, to be more specific, the straight line L1 which connects a lower end P1 of the blocking element 84D and an upper end P2 of the blocking element 84B. In other words, the structure is adopted where the lower core 315 and the upper core 325 overlap with each other on the straight line L1 when the dies are closed.

As described previously, the positions of the blocking elements 84B, 84D are displaced from each other in the X direction and there is no range where the blocking elements 84B, 84D overlap with each other. Accordingly, with the provision of the structure where two cores, that is, the upper and lower cores 315, 325 are vertically separated from each other using the straight line L1 as a boundary, by removing dies in the vertical direction, simultaneously with molding of the middle lid 60, two blocking elements 84B, 84D can be integrally molded with the lower-side peripheral walls 83B, 83D. Accordingly, it is possible to easily form the blocking elements 84B, 84D in the inside of the lower-side sleeve portion Ti. Further, a cost can be reduced compared to a case where the blocking elements 84B, 84D are molded by members separate from the lower-side peripheral walls 83B, 83D of the lower-side sleeve wall T1.

Integral molding of the blocking elements 84B, 84D is molding which is possible only by forming the lower-side exhaust sleeve potion T1 of the middle lid 60 into a shape which opens in the vertical direction. For example, such integral molding is a peculiar effect which cannot be acquired by a sleeve member having a ceiling surface sealed such as a liquid plug even when the same sleeve shape is adopted.

4. Description of Advantages

By forming the blocking elements 84B, 84D on the exhaust sleeve portion T, it is possible to provide a path through which solution droplets V of an electrolyte solution W splashed from the cell chamber 25 minimally enter the exhaust passage R while ensuring a path through which a gas is discharged from the inside of the container 20 whereby the solution droplets V of an electrolyte solution W splashed from the cell chamber 25 minimally reach the outlet of the exhaust sleeve portion T. Therefore, it is possible to suppress the entrance of solution droplets V of an electrolyte solution W splashed from the cell chamber 25 into the exhaust passage R. Accordingly, an amount of solution droplets V which move along a ceiling surface of the exhaust passage R can be reduced and hence, a leakage of solution droplets V caused by vibrations can be suppressed.

Further, in the configuration of the lead-acid battery 10 of this embodiment, the blocking elements 84B, 84D are fixed to inner surface walls of the lower-side peripheral walls 83B, 83D. As the structure for fixing the blocking elements 84B, 84D, for example, the structure may be adopted where a fixed shaft (not shown in the drawing) is provided at a center portion of the exhaust sleeve portion T, and the blocking elements 84B, 84D are fixed to the fixed shaft. However, when such a structure is adopted, the number of parts is increased so that the exhaust sleeve portion T becomes large-sized. According to the lead-acid battery 10 of this embodiment, it is unnecessary to provide such a fixed shaft inside the exhaust sleeve portion T and hence, the number of parts can be set small, and the exhaust sleeve portion T can be miniaturized, that is, the sleeve can be made fine (small). By miniaturizing the exhaust sleeve portion T, the entire length of the exhaust passage R is elongated and hence, the common passage U and the collective exhaust portion Q are disposed away from the exhaust passage R whereby solution droplets V minimally leak.

Further, in the configuration of the lead-acid battery 10 of this embodiment, the exhaust passage R is provided for each one of the cell chamber 25 of the container 20. With such a configuration, a gas generated from each cell chamber 25 can be discharged to the outside through each exhaust passage R. Further, solution droplets V in the inside of the exhaust passage R can be returned to each cell chamber 25 through the return flow hole 82. That is, all solution droplets V which condense in the exhaust passage R are made to return to the original cell chamber 25 and hence, it is possible to suppress an amount of electrolyte solution W from becoming non-uniform between the respective cell chambers 25.

<Embodiment 2>

An embodiment 2 is described with reference to FIG. 16 and FIG. 17.

The embodiment 2 differs from the embodiment 1 with respect to a point that inner peripheral walls of lower-side peripheral walls 183B, 183D which form a lower-side sleeve portion T1 of a middle lid 60 are formed into a tapered surface. To be more specific, as shown in FIG. 16, a blocking element 84B is integrally formed on an inner surface wall of the lower-side peripheral wall 183B, and a blocking element 84D is integrally formed on an inner peripheral wall of the lower-side peripheral wall 183D.

Figure 16:
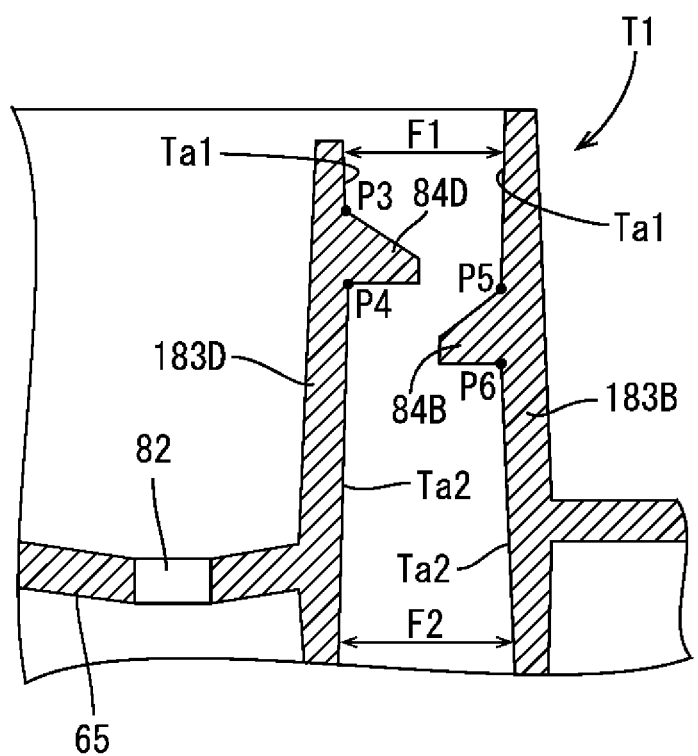
FIG. 16 is a cross-sectional view of a lower sleeve portion according to an embodiment 2 of the present invention.

As shown in FIG. 16, the inner peripheral wall of the lower-side peripheral wall 183B is formed such that a first taper Ta1 which expands an upper opening F1 toward a sleeve upper end is applied to an upper side of the blocking element 84B (an upper side of a point P3) using the blocking element 84B as a boundary, and a second taper Ta2 which expands a lower opening F2 toward a sleeve lower end is applied to a lower side of the blocking element 84B (a lower side of a point P4) using the blocking element 84B as a boundary.

In the same manner, the inner peripheral wall of the lower-side peripheral wall 183D is formed such that a first taper Ta1 which expands the upper opening F1 toward the sleeve upper end is applied to an upper side of the blocking element 84D (an upper side of a point P5) using the blocking element 84D as a boundary, and a second taper Ta2 which expands the lower opening F2 toward the sleeve lower end is applied to a lower side of the blocking element 84D (a lower side of a point P6) using the blocking element 84D as a boundary.

Figure 17:
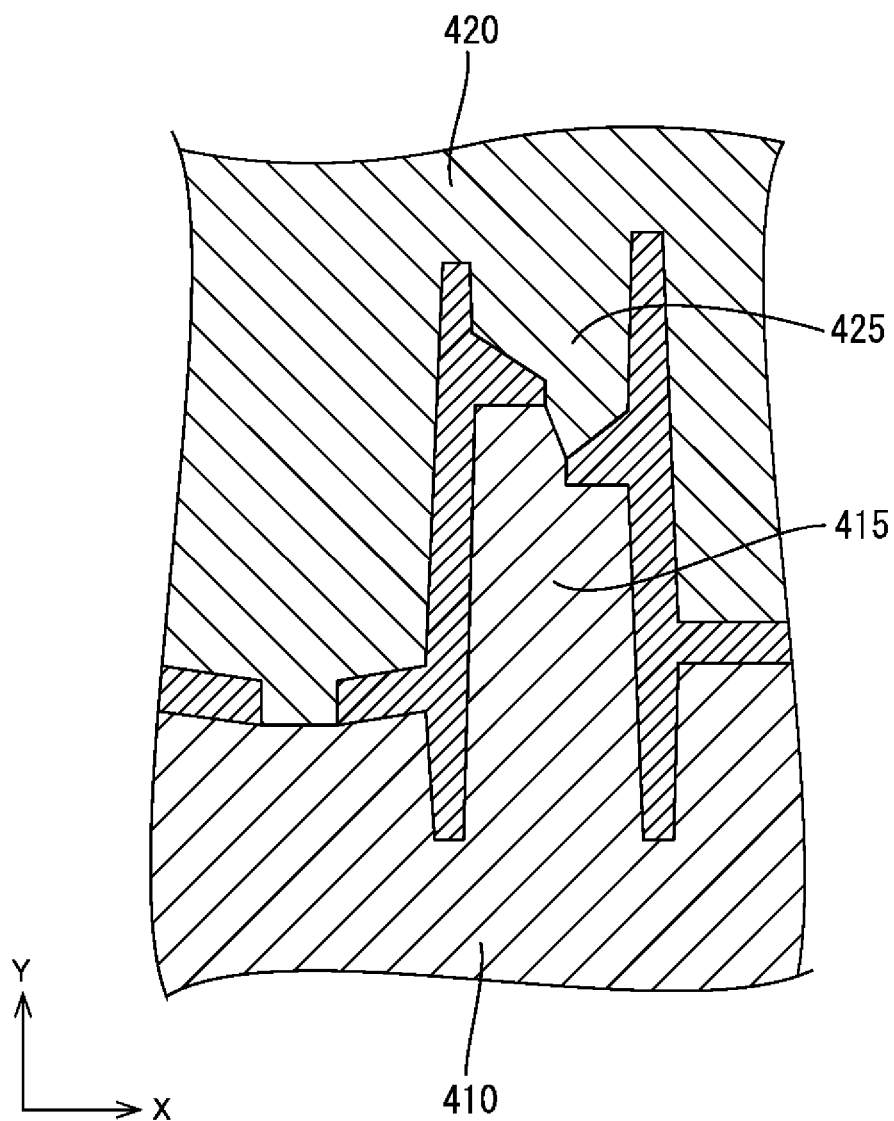
FIG. 17 is a cross-sectional view showing a portion (a periphery of a lower sleeve portion) of an injection molding die for forming a middle lid in an enlarged manner.

By applying the first taper Ta1 and the second taper Ta2 to the inner peripheral walls of the lower-side peripheral wall 183B, 183D, a molded product (the lower-side sleeve portion T1 of the middle lid 60) can be easily removed from a lower core 415 of a lower the 410 and an upper core 425 of an upper die 420 shown in FIG. 17. Further, an upper portion side of the lower-side sleeve portion T1 (an upper side using the blocking elements 84B, 84D as a boundary) is formed into a conical shape which expands upward and hence, solution droplets V easily fall whereby return flow property of solution droplets to a cell chamber 25 is increased.

<Other Embodiments>

The present invention is not limited to the embodiment described using the above-mentioned description and drawings, and the following embodiments also fall within a technical scope of the present invention, for example.

Figure 18:
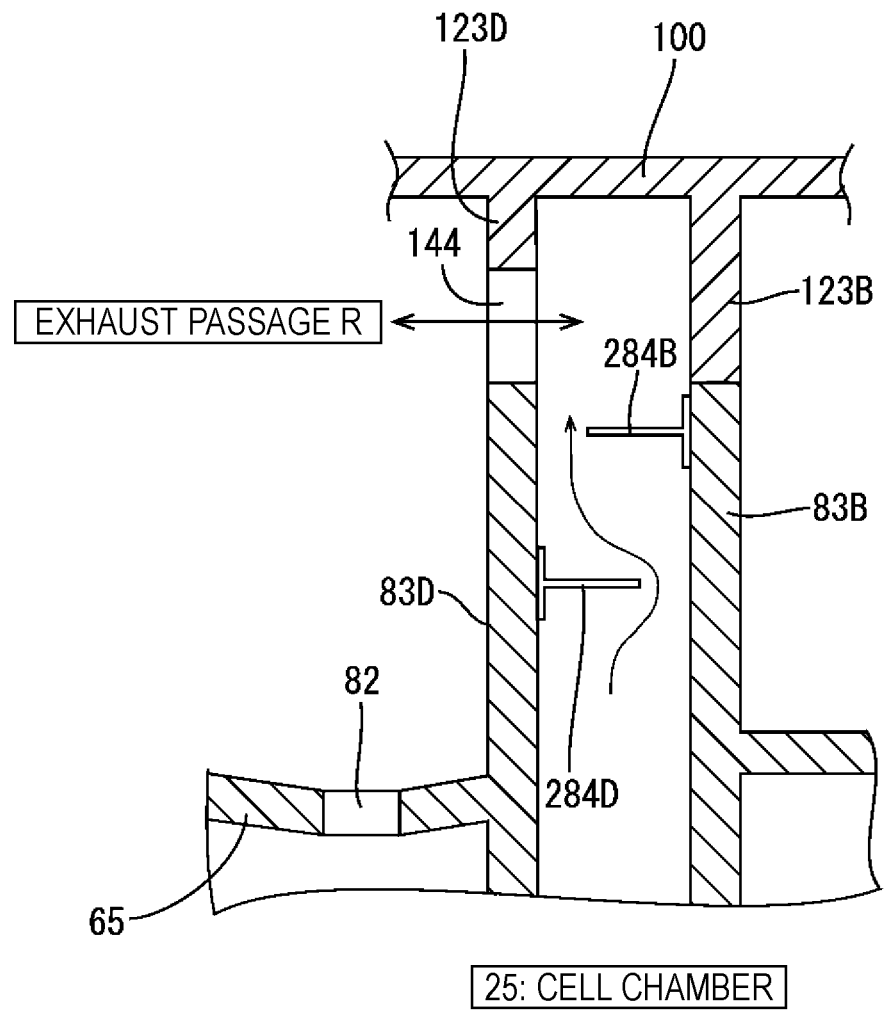
FIG. 18 is a view showing another mode of a blocking element.

(1) In the above-mentioned embodiments 1 and 2, as one example of the blocking elements, the blocking elements 84B, 84D having a trapezoidal cross section are exemplified. However, for example, the blocking elements 284B, 284D may be formed of a plate-like member as shown in FIG. 18. Further, it is not always necessary that the blocking potions 284B, 284D are integrally formed with the exhaust sleeve portion T, and the blocking elements 284B, 284D may be formed as elements separate from the exhaust sleeve portion T. Further, in the above-mentioned embodiments 1, 2, two blocking elements 84B, 84D are configured such that the positions of the blocking elements 84B, 84D are displaced from each other in a direction orthogonal to the exhaust sleeve portion T (X direction) so that there is no range where the blocking elements 84B, 84D overlap with each other as viewed in a vertical direction (Y direction). However, as shown in FIG. 18, it is sufficient the blocking elements 284B, 284D block a portion of an inner space of the exhaust sleeve portion T, and a range may be provided where the blocking elements 284B, 284D partially overlap with each other as viewed in the vertical direction (Y direction). Still further, the number of blocking elements 284B, 284D may be plural, and the number of the blocking elements 284B, 284D may be three or more.

(2) In the above-mentioned embodiments 1 and 2, the exhaust sleeve portion T is formed into an angular sleeve shape. However, the exhaust sleeve portion T may be formed into a circular sleeve shape. When the exhaust sleeve portion T is formed into a circular sleeve shape, the blocking elements may be formed into an arcuate shape and the positions of the blocking elements may be displaced from each other in a circumferential direction. For example, when the number of blocking elements is three, three blocking elements may be arranged by being displaced from each other at an angle of 120° in a circumferential direction while having positions of the blocking elements displaced from each other in a vertical direction.

(3) In the above-mentioned embodiments 1 and 2, the case is exemplified where the blocking elements 84B, 84D are fixed to the inner peripheral walls of the lower-side peripheral walls 83B, 83D. However, as the method of fixing the blocking elements, methods other than the method exemplified in the embodiments may be used. For example, a fixing shaft extending in a vertical direction may be formed on a center portion of the lower-side sleeve portion T1, and the blocking elements 84B, 84D may be fixed to the fixing shaft.

(4) In the above-mentioned embodiments 1 and 2, the case is exemplified where the exhaust sleeve portion T has the split structure formed of the lower-side sleeve portion T1 on the middle lid 60 and the upper-side sleeve portion T2 on the upper lid 100. However, the exhaust sleeve portion T may have the integral sleeve structure in place of the vertically split structure. For example, the lower-side sleeve portion T1 may be formed of a sleeve which extends by an amount corresponding to a length of the upper-side sleeve portion T2, and the exhaust sleeve portion T may be formed of only the lower-side sleeve portion T1. When the exhaust sleeve portion T is formed of only the lower-side sleeve portion T1, air tightness may be kept by welding an upper end portion of the lower-side sleeve portion T1 to a lower surface of the lid body 110 of the upper lid 100.

(5) In the above-mentioned embodiments 1 and 2, the case is exemplified where the passage wall RW which forms the side wall of the exhaust passage R has the split structure which is formed of the lower-side passage wall 85 on the middle lid 60 and the upper-side passage wall 125 on the upper lid 100. The passage wall RW may be formed of the single wall structure in place of the vertically split structure. For example, the upper-side passage wall 125 may be formed of a wall which extends by an amount corresponding to a length of the lower-side passage wall 85, and the passage wall RW may be formed of only the upper-side passage wall 125 on the upper lid 100. When the passage wall RW is formed of only the upper-side passage wall 125, air tightness may be kept by welding a lower end portion of the upper-side passage wall 125 to an upper surface wall 65A of the plateau portion 65 of the middle lid 60. In the same manner, the side wall of the common passage U and the collective exhaust portion Q may also adopt the single wall structure where the wall is formed only on the upper lid 100 instead of the vertically split structure.

(6) In the above-mentioned embodiments, the configuration is exemplified where a gas generated in the respective cell chambers 25 is supplied to the collective exhaust portion Q through the respective exhaust passage R and the common passage U, and the gas is collectively discharged from the exhaust duct 200. That is, the structure is adopted where the exhaust passage R is made to communicate with the outside through the common passage U, the collective exhaust portion Q and the exhaust duct 200. However, the exhaust passage R may have the structure where the passage outlet directly communicates with the outside as an exhaust port. That is, the exhaust passage R may be configured such that a gas generated in each cell chamber 25 is individually discharged from the exhaust port formed in each exhaust passage R.

(7) In the above-mentioned embodiments 1 and 2, the configuration is exemplified where the plurality of cell chambers 25 are formed in the container 20. However, the container 20 may be configured not to include the cell chambers 25.

(8) In the above-mentioned embodiments 1 and 2, the exhaust passage R is exemplified as one example of "exhaust space" of the present invention. However, it is sufficient that the exhaust space is a space which communicates with the outside and a gas can be discharged through the exhaust space. For example, a discharge chamber which communicates with the outside may be provided for each one of cell chambers between the middle lid 60 and the upper lid 100, and the exhaust chamber may be used as an exhaust space.

(9) In the above-mentioned embodiments 1 and 2, the exhaust sleeve portion T is exemplified as one example of "sleeve member" of the present invention. However, it is sufficient that the sleeve member is configured to make the exhaust passage (exhaust space) R and the cell chamber 25 of the container 20 communicate with each other. For example, a communication sleeve (not shown in the drawing) which makes the exhaust passage R and the cell chamber 25 communicate with each other may be formed on the upper surface wall 65A of the plateau portion 65 of the middle lid 60. In this case, the configuration may be adopted where the blocking elements (not shown in the drawing) may be provided in the inside of the communication sleeve.

(10) In the above-mentioned embodiments 1 and 2, the case is exemplified where the lid member 50 has the split configuration formed of the middle lid 60 and the upper lid 100. However, it is sufficient that the lid member 50 is configured to include the exhaust space which communicates with the outside and the sleeve member which communicates with the cell chamber of the container, and may be formed of a lid having an integral structure where the middle lid 60 and the upper lid 100 are integrally formed with each other.

(11) In the above-mentioned embodiments 1 and 2, the configuration is exemplified where the blocking elements 84B, 84D are formed on the exhaust sleeve potion T. However, a blocking element may be also formed in the return flow hole 82. Further, a blocking element may not be formed on the exhaust sleeve portion T, and the blocking element 84 may be formed only in a return flow portion for returning solution droplets V to the container 20. That is, the blocking element 84 may be formed in the inside of the return flow portion formed into a sleeve shape (one example of sleeve member).

What is claimed is:

1. A lead-acid battery comprising:
    a power generating element;
    an electrolyte solution;
    a container which houses the power generating element and the electrolyte solution; and
    a lid member which is configured to seal the container and in which an exhaust space and a sleeve member are formed, the exhaust space communicating with an outside, an inside of the container being communicated with the exhaust space through the sleeve member,
    wherein a bottom surface of the exhaust space is inclined such that a solution in the space returns to the inside of the container,
    wherein the sleeve member has a plurality of blocking elements arranged in a spaced-apart manner in an extending direction of the sleeve member, and the inside of the container is communicated with the exhaust space through a space formed between the plurality of blocking elements, and
    wherein an entirety of one of the plurality of blocking elements is located in the extending direction of the sleeve member at a position that is different from a position at which an entirety of another one of the plurality of blocking elements is located.

2. The lead-acid battery according to claim 1, wherein the lid member includes: a return flow portion for returning the solution in the exhaust space to the inside of the container; and an exhaust portion provided separately from the return flow portion and making the exhaust space and the inside of the container communicate with each other, and
 wherein the exhaust portion is formed of the sleeve member having the plurality of blocking elements.

3. The lead-acid battery according to claim 1, wherein the lid member includes: a middle lid which covers the container; and an upper lid bonded to an upper portion of the middle lid in an overlapping manner,
 wherein the sleeve member is formed on the middle lid, and
 wherein the plurality of blocking elements arranged in the sleeve member are configured not to overlap with each other as viewed in the extending direction of the sleeve member.

4. The lead-acid battery according to claim 1, wherein the electrolyte solution is allowed to flow in the container.

5. The lead-acid battery according to claim 1, a first spacing between a lowermost and innermost corner of the one of the plurality of blocking elements and an uppermost and innermost corner of the another one of the plurality of blocking elements is greater than a second spacing between the one of the plurality of blocking elements and the another one of the plurality of blocking elements in a direction perpendicular to the extending direction of the sleeve member.

6. The lead-acid battery according to claim 1, wherein a lower surface of the plurality of blocking elements is a horizontal surface.

7. The lead-acid battery according to claim 1, wherein the extending direction of the sleeve member is a direction toward the exhaust space.

8. A lead-acid battery comprising:
 a power generating element;
 an electrolyte solution;
 a container which houses the power generating element and the electrolyte solution; and
 a lid member which is configured to seal the container and in which an exhaust space and a sleeve member are formed, the exhaust space communicating with an outside, an inside of the container being communicated with the exhaust space through the sleeve member,
 wherein a bottom surface of the exhaust space is inclined such that a solution in the space returns to the inside of the container,
 wherein the sleeve member has a plurality of blocking elements arranged in a spaced-apart manner in an extending direction of the sleeve member, and the inside of the container is communicated with the exhaust space through a space formed between the plurality of blocking elements, and
 wherein a lower surface of one of the plurality of blocking elements is located in the extending direction of the sleeve member at a position that is different from a position at which a lower surface of another one of the plurality of blocking elements is located.

9. The lead-acid battery according to claim 8, wherein the extending direction of the sleeve member is a direction toward the exhaust space.

10. A lead-acid battery comprising:
 a power generating element;
 an electrolyte solution;
 a container which houses the power generating element and the electrolyte solution; and
 a lid member which is configured to seal the container and in which an exhaust space and a sleeve member are formed, the exhaust space communicating with an outside, an inside of the container being communicated with the exhaust space through the sleeve member,
 wherein a bottom surface of the exhaust space is inclined such that a solution in the space returns to the inside of the container,
 wherein the sleeve member has a plurality of blocking elements arranged in a spaced-apart manner in an extending direction of the sleeve member, and the inside of the container is communicated with the exhaust space through a space formed between the plurality of blocking elements, and
 wherein when viewed in a direction perpendicular to the extending direction of the sleeve member, one of the plurality of blocking elements does not overlap with another one of the plurality of blocking elements.

* * * * *